United States Patent
Roller et al.

(10) Patent No.: US 9,861,973 B2
(45) Date of Patent: Jan. 9, 2018

(54) METHODS AND APPARATUS FOR MAKING CATALYST FILMS

(71) Applicant: University of Connecticut, Farmington, CT (US)

(72) Inventors: Justin Roller, Portland, OR (US); Radenka Maric, Andover, CT (US)

(73) Assignee: University of Connecticut, Farmington, CT (US)

( * ) Notice: Subject to any disclaimer, the term of this patent is extended or adjusted under 35 U.S.C. 154(b) by 306 days.

(21) Appl. No.: 14/399,593

(22) PCT Filed: May 10, 2013

(86) PCT No.: PCT/US2013/040533
§ 371 (c)(1),
(2) Date: Nov. 7, 2014

(87) PCT Pub. No.: WO2013/170138
PCT Pub. Date: Nov. 14, 2013

(65) Prior Publication Data
US 2015/0141240 A1    May 21, 2015

Related U.S. Application Data

(60) Provisional application No. 61/645,458, filed on May 10, 2012.

(51) Int. Cl.
*C23C 4/12* (2016.01)
*B01J 37/02* (2006.01)
(Continued)

(52) U.S. Cl.
CPC .......... *B01J 37/0221* (2013.01); *B01J 19/26* (2013.01); *B01J 23/468* (2013.01); *B01J 23/755* (2013.01);
(Continued)

(58) Field of Classification Search
None
See application file for complete search history.

(56) References Cited

U.S. PATENT DOCUMENTS

| 2,920,001 A * | 1/1960 | Smith ...................... B05B 7/201 |
| | | 118/308 |
| 5,338,364 A * | 8/1994 | Kurihara ................... C23C 4/04 |
| | | 118/715 |

(Continued)

OTHER PUBLICATIONS

Roller, "Low Platinum Electrodes for Proton Exchange Fuel Cells Manufactured by Reactive Spray Deposition," Ph.D. Thesis, available online Feb. 2009.*

(Continued)

*Primary Examiner* — Charles Capozzi
(74) *Attorney, Agent, or Firm* — McCarter & English, LLP

(57) ABSTRACT

The present disclosure provides improved films/coatings (e.g., catalyst films/coatings), and improved assemblies/methods for fabricating such films/coatings. More particularly, the present disclosure provides advantageous assemblies/methods for fabricating or synthesizing catalytic material (e.g., catalytic nanostructures) in flame and depositing the catalytic material onto substrates. The present disclosure provides improved catalytic nanostructures, and improved assemblies and methods for their manufacture. In exemplary embodiments, the present disclosure provides for methods/assemblies for synthesizing electrocatalytic nanostructures in flame and depositing such material or catalyst onto different substrates or supports. As such, the present disclosure provides advantageous assemblies that are configured and dimensioned to deposit fully dense, controlled porosity films (e.g., films of metals and oxides or core-shell particles) onto different substrates.

20 Claims, 30 Drawing Sheets

(51) Int. Cl.
  B05C 19/00 (2006.01)
  B01J 19/26 (2006.01)
  B01J 23/46 (2006.01)
  B01J 23/755 (2006.01)
  H01M 4/88 (2006.01)
  C23C 4/129 (2016.01)
  B05B 7/20 (2006.01)
  H01M 4/525 (2010.01)
  H01M 4/92 (2006.01)

(52) U.S. Cl.
  CPC ............ *B05C 19/00* (2013.01); *C23C 4/129* (2016.01); *H01M 4/886* (2013.01); *B05B 7/208* (2013.01); *H01M 4/525* (2013.01); *H01M 4/926* (2013.01)

(56) References Cited

U.S. PATENT DOCUMENTS

| | | | |
|---|---|---|---|
| 5,445,325 A | 8/1995 | White | |
| 5,932,293 A * | 8/1999 | Belashchenko | B05B 7/1606 118/308 |
| 6,601,776 B1 | 8/2003 | Oljaca et al. | |
| 6,728,092 B2 | 4/2004 | Hunt et al. | |
| 8,993,472 B2 | 3/2015 | Roller et al. | |
| 2004/0002221 A1* | 1/2004 | O'Donnell | C23C 16/4404 438/710 |
| 2008/0280056 A1 | 11/2008 | Maric et al. | |
| 2009/0246398 A1* | 10/2009 | Kurahashi | C23C 4/129 427/456 |

OTHER PUBLICATIONS

PCT International Search Report and Written Opinion for PCT/US2013/040533 dated Aug. 19, 2013; 7 pages.
PCT/US2013/040533, May 10, 2013, WO 2013/170138.
U.S. Appl. No. 61/645,458, filed May 10, 2012.

* cited by examiner

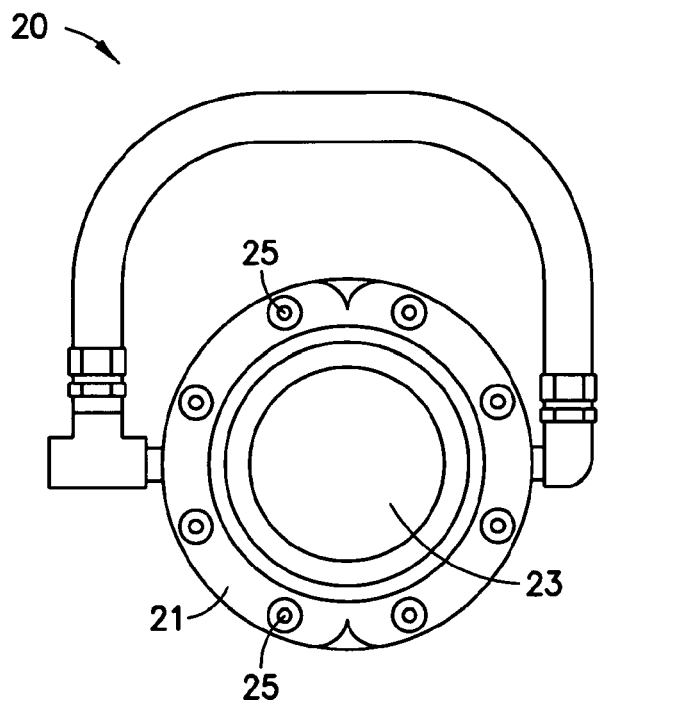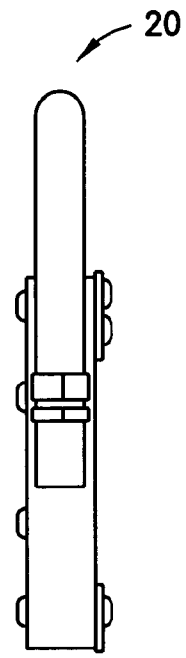
FIG.4  FIG.5
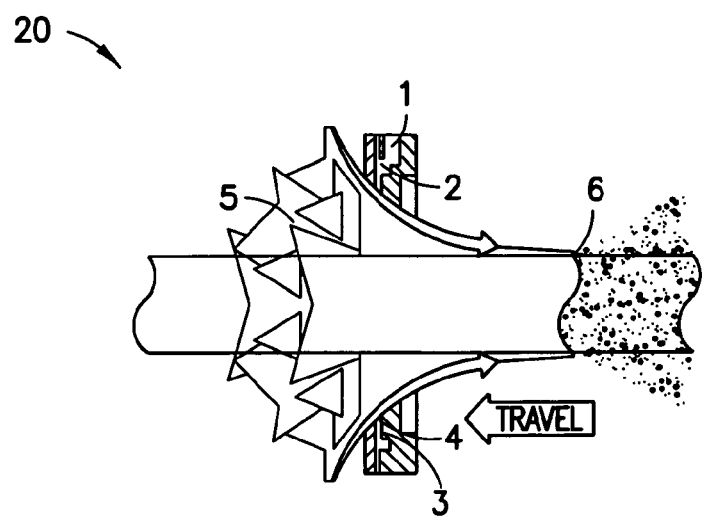
FIG.6

METHODS AND APPARATUS FOR MAKING CATALYST FILMS

CROSS-REFERENCE TO RELATED APPLICATIONS

This application claims the benefit of U.S. Provisional Application Ser. No. 61/645,458 filed May 10, 2012, the contents of which is herein incorporated by reference in its entirety.

BACKGROUND

1. Technical Field

The present disclosure relates to films/coatings (e.g., catalyst films/coatings) and assemblies/methods for fabricating films/coatings and, more particularly, to assemblies and methods for fabricating or synthesizing catalytic material (e.g., catalytic nanostructures) in flame and depositing the catalytic material onto substrates.

2. Background Art

In general, efficient energy generation and storage is one of the most important issues to solve for the 21st century. Within this, electrochemical devices are expected to play a significant role as their performance is typically not limited by traditional thermochemical cycles (e.g., Carnot and Rankine cycles), and this is expected to lead to electrochemical systems with ultra high efficiencies. For example, the maximum achievable efficiency of a general proton exchange membrane (PEM) fuel cell operating at 80° C., $\epsilon=\Delta G/\Delta H$, is about 93%. This compares favorably to only 63% for the Rankine cycle (though only about 40% is typically achieved in practice), which is responsible for approximately 90% of the global electricity production. Of course, fuel cells require high purity hydrogen fuel. Hydrogen is also one of the most highly utilized industrial gases and can also be employed as an energy carrier or means for storage of intermittent renewable energy (e.g., PV solar, wind, etc.). This makes the high efficiency generation of hydrogen a top priority, particularly when it is considered that water electrolysis to hydrogen and its use as a fuel is a potentially sustainable energy cycle that would lower a country's dependence on foreign oil. Insufficient kinetics for the oxygen reduction reaction (ORR) at the PEM fuel cell cathode in acid media on state-of-the-art electrocatalysts and the current requirement for relatively high loading of Pt for the hydrogen evolution reaction (HER) at the PEM electrolyzer cathode leads to low Pt mass activity of both unsupported and carbon supported Pt (Pt/C) catalysts. This low mass activity remains one of the most serious challenges for the mass deployment of proton exchange based electrolyzers and fuel cells.

Three of the most significant challenges facing the wide commercialization of the proton exchange membrane fuel cell (PEMFC) are: i) improving catalyst tolerance to impurities; ii) simplifying water and thermal management schemes; and iii) enhancing the kinetics of the oxygen reduction reaction (ORR) at the cathode. Research over the past decade has focused on mitigating the above challenges by increasing the operating temperature of PEMFCs from about 80° C. to greater than 120° C.; however, operating at elevated temperatures introduces new difficulties in maintaining the proton exchange membrane in a state of adequate hydration. In general, some phosphoric acid-doped polybenzimidazole (PBI) membranes have been the most successful. PBI outperforms conventional membranes (e.g., Nafion®) by self-solvating protons to allow charge migration, hence minimizing the reliance on water for proton transport.

In general, the heart of the PEMFC is the membrane electrode assembly (MEA), which typically consists of the membrane sandwiched by the active catalyst layers. State-of-the-art MEA manufacturing is a multi-step, energy and manpower intensive process. MEAs also typically contain a high loading of noble metal catalysts which must be mined and processed to high levels of purity. Some entities uses a single-step MEA manufacturing approach for high temperature PEMFCs (HT-PEMFC). At the catalyst level, PEMFCs generally have three significant limitations: 1) low Pt utilization, leading to high loadings and high cost; 2) Pt agglomeration, leading to device performance degradation; and 3) support corrosion, limiting high temperature operation. One factor with regards to low Pt utilization in current PEMFCs is the lack of guiding principles for the rational design of electrodes, which involves organizing the catalyst, support and ionomer to balance complex relationships between electrochemically active area, reactant mass transport, electron transport and current collection.

A variety of approaches have been employed in attempting to address these issues. One approach involves increasing the overall surface area available for reaction by forming metal particles with nanometer-scale dimensions. However, a primary challenge with the use of nanoparticulate electrocatalysts is that these zero-dimensional (0D) morphologies possess proportionally higher numbers of defect sites, lattice boundaries, and low coordination atoms at their surfaces. Inherently, defect sites are substantially less active towards oxygen reduction reaction than defect-free crystal planes, largely because of differences in the local coordination geometry and surface energy, which can directly influence the interfacial interaction between the metal surface sites and the adsorbed oxygen species.

Core-shell nanoparticles present a unique mechanism by which catalyst researchers can tune activity for a wide array of chemical and electrochemical processes. Because the core composition shifts the electronic structure at the surface of the active shell material, core-shell structured nanoparticle catalysts can be tailored to optimize the surface activity and/or product selectivity for selected applications. However, to take advantage of modified electronic structures for tuning catalytic activity, tight control of the shell growth to one or two monolayers may be required. For Pt and other precious metal shells, some experimental and theoretical studies over the past decade have been devoted to investigating the role of underlying supports on the catalytic and electrocatalytic activity of Pt and other noble metals. A picture of the theory behind metal-on metal core-shell particles is starting to emerge; however, the coupled geometric and electronic effects of non-metallic cores (such as carbides or oxides) on precious metal shell activity is not well understood. While experimental studies with 1-2 monolayer Pt shells have indicated the promise of such systems for enhanced electrochemical activity, advances in the fundamental understanding of metal/non-metal interactions can provide guidance on core-shell nanoparticle design.

Fabrication of core-shell catalysts has sometimes been based on the use of passivating ligands in colloidal suspensions. In general, passivation is important for controlling shell growth to maintain adequately thin shells for tuning surface reactivity associated with the core-shell structure, but the remaining ligands can inhibit catalyst functionality, particularly for systems like electrochemical reactions where catalyst/support interactions are important. Post-processing thermal treatments to remove the ligands can require excessive temperatures that can disrupt the preferred core-shell structure. To substantially eliminate ligands from core-shell fabrication, researchers have implemented electrochemical techniques such as voltammetric surface dealloying, underpotential electrodeposition with shell metal displacement in liquid solutions, or gas-phase synthesis with atomic-layer deposition on fluidized particles. However, expensive batch processes do not provide an economic approach for industrial scale catalyst manufacturing needed for many energy-related electrochemical and chemical conversion applications. Developing scalable fabrication processes that provide the necessary control of nanoparticle structure for enhanced activity presents significant techno-economic challenges for bringing core-shell nanoparticles to large-scale industrial catalytic applications.

Thus, an interest exists for improved films/coatings (e.g., catalyst films/coatings), and related assemblies/methods for fabricating improved films/coatings. These and other inefficiencies and opportunities for improvement are addressed and/or overcome by the assemblies, systems and methods of the present disclosure.

SUMMARY

The present disclosure provides advantageous films/coatings (e.g., catalyst films/coatings), and improved assemblies/methods for fabricating films/coatings. More particularly, the present disclosure provides improved assemblies and methods for fabricating or synthesizing catalytic material (e.g., catalytic nanostructures) in a flame and depositing the catalytic material onto substrates.

In general, the present disclosure relates to the field of catalytic nanostructures, and improved assemblies and methods for their manufacture. In particular, the present disclosure provides for methods/assemblies for synthesizing electrocatalytic nanostructures in a flame and depositing such material or catalyst (e.g., under controlled environments: air, $H_2$, $N_2$) onto different substrates or supports (e.g., ceramic particles, carbon, fibers, polymers, metal supports), and activating such nanostructures by carbon monoxide—adsorption-induced desorption and electrochemical oxidation. The present disclosure provides advantageous assemblies and/or fixtures that are configured and dimensioned to deposit fully dense, controlled porosity films (e.g., films of metals and oxides or core-shell particles) onto different substrates. Some exemplary uses of the films (e.g., catalytic films) of the present disclosure include use in fuel cells (e.g., low temperature fuel cells), proton exchange membranes (e.g., high temperature proton exchange membranes), batteries (e.g., Li-ion batteries), and low temperature conversion of CO to $CO_2$.

Disclosed herein are methods, apparatus, operating conditions and related improvements in the field of applying films (e.g., films of nanomaterials such as catalysts) onto substrates and/or membranes or the like. In certain embodiments, the present disclosure provides for assemblies and methods for dispersing catalysts (e.g., platinum catalysts) onto supports (e.g., corrosion resistant supports) using a dry one-step process.

The present disclosure also provides for assemblies and methods for the fabrication or formation of oxygen evolution anodes in electrolysis using a dry one-step process. The present disclosure also provides for assemblies and methods for the direct application of cathodes useful in lithium batteries using a dry one-step process.

The methods, apparatus, and related improvements disclosed herein include the processing conditions, formulations, equipment and technical knowledge to apply films (of controlled thickness) of catalysts using a one-step catalyst formation process. As disclosed herein, certain embodiments are presented that do not require a wet chemical step for direct formation of catalyst film for application in several different exemplary technology areas. For example, the present disclosure provides for the direct dry formation of cathode materials for lithium ion batteries, oxygen evolution catalysts for PEM electrolysis, and corrosion resistant catalysts.

Certain embodiments of the present disclosure provide for the formation and processing of a catalyst film on a dispersion media (e.g., a support) for increasing the utilization of the catalyst, and/or preventing loss of activity due to corrosion of the catalyst support. Some intended target areas of this and similar embodiments include low temperature proton exchange fuel cells (PEM), phosphoric acid fuel cell catalysts (PAFC), and electrocatalysts for electrolysis, and electrodes for Li-ion batteries.

Other embodiments of the present disclosure provide for the formation and processing into a film of catalyst an anode for the splitting of water into oxygen using, by way of example, $IrO_2$, $RuO_2$, Ir, Ru and blends of $Ir_{1-x}Ru_xO_{2-y}$. Where x represents the molar percentage of Ru and y the oxygen deficiency.

Other embodiments of the present disclosure provide for the formation and processing into a catalyst film a cathode or anode for the storage of lithium as an intercalation cathode/anode, with certain embodiments not using binder materials, solvents for binder, and/or drying step(s).

Embodiments of methods and apparatus disclosed herein advantageously reduce the processing steps of catalyst formation, additive injection (e.g., support, binder, or electronic conducting phase) and film formation into one step, with independent control of the ratios of the individual components in real-time. Moreover, embodiments of methods and apparatus disclosed herein provide for the design of resulting microstructures having nanosized features, thereby leading to improved performance of the catalyst by decreasing diffusion lengths and/or by increasing surface area for improved catalysis. It is noted that embodiments of methods and apparatus disclosed herein can be applied to and/or utilized in the production of electrolyzer catalysts and films, battery films and catalyzed corrosion resistant supports.

In exemplary embodiments, the present disclosure provides for assemblies and methods that include an advantageous quench step and/or system, and/or include a means for controllably moving a substrate material. Other modifications are encompassed by the assemblies and methods of the present disclosure, including the ability to use precursors of differing chemistry, structure and/or particle size as suited to a desired product to be made.

In certain embodiments, the present disclosure provides for a manufacturing process for fuel cells that uses about 10-times less catalyst material with little waste; the waste mostly comprises $CO_2$ and $H_2O$. Embodiments disclosed include a low-temperature process and allow important industrial controls and flexibility.

Also disclosed herein is a process whereby atom-sized solids are prepared and sprayed onto fuel cell membranes in a carefully calibrated fine layer. Flame-based dispersion of catalyst material allows the material to bond to the membrane quickly, thereby eliminating several binding and drying steps needed in other currently available manufacturing processes. The thickness of the material layers can be carefully controlled, with the layers being thin enough to provide maximum conductivity and thick enough to prevent corrosion and to maintain durability.

Also disclosed herein are processes for use in the production of advanced lithium-ion batteries. The processes provide a direct dry application of nanocoatings used inside batteries, and eliminates several binding steps compared to conventional methods. Its high level of particle control allows for the use of less material, thereby decreasing cost.

In certain embodiments, the processes and assemblies disclosed herein achieve catalyst deposition directly on membranes (e.g., high-temperature membranes). In exemplary embodiments, substantially lowered weight loadings may be used.

Moreover, exemplary processes of the present disclosure enable use of much lower amounts of highly expensive catalysts, and/or provide mild processing conditions to minimize possible damage to membranes.

Using a novel reactive spray deposition technique for applying the catalyst to the membrane, the present disclosure demonstrates the feasibility of reducing the direct manufacturing energy cost of the MEA by over about 50% through elimination of multiple process steps. Moreover, indirect energy savings from mining and/or refining operations can be reduced by eliminating about greater than 90% of the catalyst needed for MEA manufacture.

The present disclosure provides for an assembly for fabricating catalytic material including a first elongated member extending from a first end to a second end, the first end in fluid communication with a liquid precursor feedstock that includes particles; a second elongated member extending from a first end to a second end, the first end mounted with respect to the second end of the first elongated member and in fluid communication with the liquid precursor feedstock; a channel of a housing, the channel disposed around at least a portion of the second elongated member, the channel configured and dimensioned to supply a fuel that is supplied along with the liquid precursor feedstock from the second end of the second elongated member to form a substantially co-flow spray that is supplied into the open atmosphere proximal to the second end of the second elongated member and ignited to form a flame spray; a surface of the housing positioned proximal to the second end of the second elongated member and angled relative to the central axis of the second elongated member, the angled surface including a plurality of ports, each port configured and dimensioned to supply a gas stream that is ignited to stabilize the flame spray; wherein the housing is configured to direct the stabilized flame spray toward a substrate for deposition of the particles thereon.

The present disclosure also provides for an assembly for fabricating catalytic material wherein the angled surface of the housing is angled at about 45° relative to the central axis of the second elongated member. The present disclosure also provides for an assembly for fabricating catalytic material wherein the angled surface includes six ports, the ports positioned substantially evenly spaced apart from one another about a radius around the central axis of the second elongated member.

The present disclosure also provides for an assembly for fabricating catalytic material further including a substantially circular quench assembly, the circular quench assembly including a plurality of nozzles that are configured to introduce turbulence or vapor to the flame spray to cool the flame spray or dilute the gas stream.

The present disclosure also provides for an assembly for fabricating catalytic material further including at least one humidifier nozzle, the at least one humidifier nozzle configured and dimensioned to supply humidity to the substrate.

The present disclosure also provides for an assembly for fabricating catalytic material wherein the substrate is mounted with respect to a substrate holder, the substrate holder configured and dimensioned to hold a liquid to hydrate or cool the substrate.

The present disclosure also provides for an assembly for fabricating catalytic material wherein the deposited particles include platinum particles; and wherein the substrate includes a corrosion resistant support. The present disclosure also provides for an assembly for fabricating catalytic material wherein the deposited particles form at least a portion of an oxygen evolution anode. The present disclosure also provides for an assembly for fabricating catalytic material wherein the deposited particles form at least a portion of a lithium battery cathode or anode.

The present disclosure also provides for an assembly for fabricating catalytic material wherein the deposited particles include a catalytic microstructure having nanosized features. The present disclosure also provides for an assembly for fabricating catalytic material wherein the deposited particles form at least a portion of a core-shell particle structure.

The present disclosure also provides for an assembly for fabricating catalytic material wherein the substrate includes nanofibers; and wherein at least a portion of the particles are deposited on the nanofibers. The present disclosure also provides for an assembly for fabricating catalytic material wherein the liquid precursor feedstock includes propane; and wherein the co-flow spray is formed at least in part by a combination of pressure, heat and supercritical atomization due to the expansion of the propane above its critical temperature thereby forming droplets.

The present disclosure also provides for an assembly for fabricating catalytic material wherein the deposited particles include amorphous particles. The present disclosure also provides for an assembly for fabricating catalytic material wherein the deposited particles include crystalline particles.

The present disclosure also provides for a method for fabricating catalytic material including providing a first elongated member extending from a first end to a second end, the first end in fluid communication with a liquid precursor feedstock that includes particles; providing a second elongated member extending from a first end to a second end, the first end mounted with respect to the second end of the first elongated member and in fluid communication with the liquid precursor feedstock; providing a channel of a housing, the channel disposed around at least a portion of the second elongated member; supplying a fuel to the channel, the channel configured and dimensioned to supply the fuel along with the liquid precursor feedstock from the second end of the second elongated member to form a substantially co-flow spray; supplying the substantially co-flow spray into the open atmosphere proximal to the second end of the second elongated member and igniting it to form a flame spray; providing a surface of the housing positioned proximal to the second end of the second elongated member and angled relative to the central axis of the second elongated member, the angled surface including a plurality of ports, each port configured and dimensioned to supply a gas stream; igniting the gas stream to stabilize the flame spray; directing the stabilized flame spray toward a substrate for deposition of the particles thereon.

The present disclosure also provides for a method for fabricating catalytic material wherein the angled surface of the housing is angled at about 45° relative to the central axis of the second elongated member. The present disclosure also provides for a method for fabricating catalytic material wherein the angled surface includes six ports, the ports positioned substantially evenly spaced apart from one another about a radius around the central axis of the second elongated member.

The present disclosure also provides for a method for fabricating catalytic material further including a substantially circular quench assembly, the circular quench assembly including a plurality of nozzles that are configured to introduce turbulence or vapor to the flame spray to cool the flame spray or dilute the gas stream.

The present disclosure also provides for a method for fabricating catalytic material further including at least one humidifier nozzle, the at least one humidifier nozzle configured and dimensioned to supply humidity to the substrate.

The present disclosure also provides for a method for fabricating catalytic material wherein the substrate is mounted with respect to a substrate holder, the substrate holder configured and dimensioned to hold a liquid to hydrate or cool the substrate.

The present disclosure also provides for a method for fabricating catalytic material wherein the deposited particles include platinum particles; and wherein the substrate includes a corrosion resistant support. The present disclosure also provides for a method for fabricating catalytic material wherein the deposited particles form at least a portion of an oxygen evolution anode. The present disclosure also provides for a method for fabricating catalytic material wherein the deposited particles form at least a portion of a lithium battery cathode or anode.

The present disclosure also provides for a method for fabricating catalytic material wherein the deposited particles include a catalytic microstructure having nanosized features. The present disclosure also provides for a method for fabricating catalytic material wherein the deposited particles form at least a portion of a core-shell particle structure.

The present disclosure also provides for a method for fabricating catalytic material wherein the substrate includes nanofibers; and wherein at least a portion of the particles are deposited on the nanofibers. The present disclosure also provides for a method for fabricating catalytic material wherein the liquid precursor feedstock includes propane; and wherein the co-flow spray is formed at least in part by a combination of pressure, heat and supercritical atomization due to the expansion of the propane above its critical temperature thereby forming droplets.

The present disclosure also provides for a method for fabricating catalytic material wherein the deposited particles include amorphous particles. The present disclosure also provides for a method for fabricating catalytic material wherein the deposited particles include crystalline particles.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein:

FIG. 4 is a front view of an exemplary quench assembly for use in a reactive spray deposition assembly of the present disclosure;

FIGS. 5-6 are side views of the quench assembly of FIG. 4;

DETAILED DESCRIPTION

Figure 1:
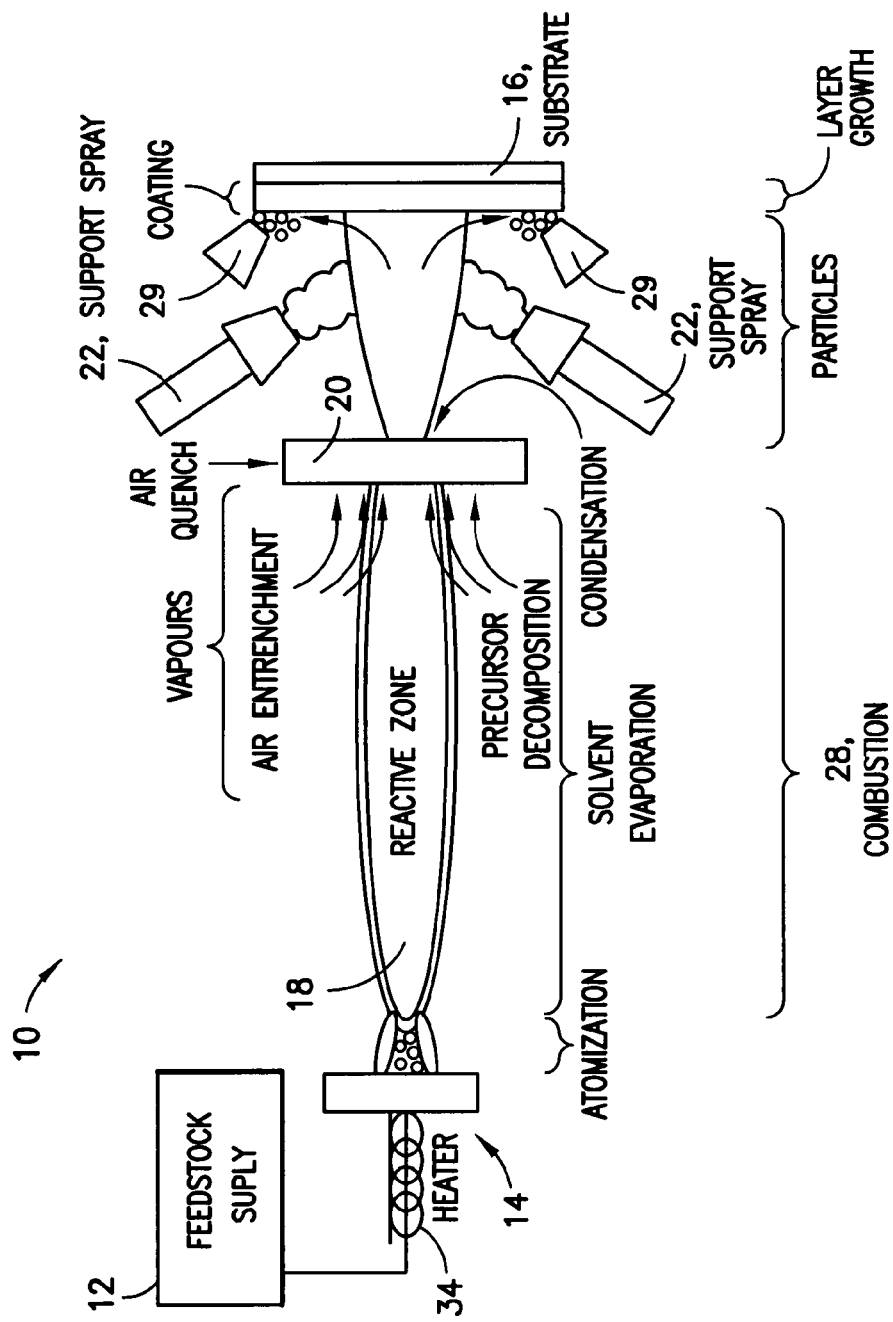
FIG. 1 is an overview of an exemplary embodiment of a reactive spray deposition assembly of the present disclosure.

The exemplary embodiments disclosed herein are illustrative of advantageous films/coatings (e.g., catalyst films/coatings), and systems of the present disclosure and methods/techniques thereof. It should be understood, however, that the disclosed embodiments are merely exemplary of the present disclosure, which may be embodied in various forms. Therefore, details disclosed herein with reference to exemplary films/fabrication methods and associated processes/techniques of assembly and use are not to be interpreted as limiting, but merely as the basis for teaching one skilled in the art how to make and use the advantageous films/systems and/or alternative films/coatings of the present disclosure.

The present disclosure provides improved films/coatings (e.g., catalyst films/coatings), and improved assemblies/methods for fabricating such films/coatings. More particularly, the present disclosure provides advantageous assemblies/methods for fabricating or synthesizing catalytic material (e.g., catalytic nanostructures) in flame and depositing the catalytic material onto substrates.

In general, the present disclosure provides improved catalytic nanostructures, and improved assemblies and methods for their manufacture. In exemplary embodiments, the present disclosure provides for methods/assemblies for synthesizing electrocatalytic nanostructures in a flame and depositing such material or catalyst (e.g., under controlled environments: air, $H_2$, $N_2$) onto different substrates or supports. As such, the present disclosure provides advantageous assemblies that are configured and dimensioned to deposit fully dense, controlled porosity films (e.g., films of metals and oxides or core-shell particles) onto different substrates. Some exemplary uses of the exemplary films (e.g., catalytic films) of the present disclosure include use in fuel cells, proton exchange membranes, batteries, and low temperature conversion of CO to $CO_2$.

Current practice provides that some methods for fabricating catalyst films or the like generally use solvent based systems with tape casting, slot die casting or spraying followed by drying. These techniques typically require at least two to three separate steps: i) catalyst formation in an liquid environment, ii) forming a slurry of the catalyst, and iii) application of the catalyst by means of tape casting or spraying a wet slurry followed by drying. Other known technologies include high-vacuum systems that are essentially batch reactions with high capital cost. For the formation of film onto a dispersion media, the catalyst needs to be synthesized, attached to the support, made into an ink, and then sprayed, requiring about 5-6 steps.

In exemplary embodiments, the present disclosure provides for improved assemblies and methods for fabricating films/coatings (e.g., catalyst films/coatings) that include as few as one single processing/fabrication step, thereby providing a significant commercial, operational and/or manufacturing advantage as a result.

The exemplary RSDT assemblies/methods of the present disclosure substantially reduce both direct (e.g., from MEA fabrication) and indirect (e.g., from mining and scrap) energy usage. The exemplary RSDT assemblies/methods substantially eliminates several of the process steps that are associated with the ink based process baseline. Moreover, the independent control of the components in the exemplary systems (e.g., catalyst, support and/or ionomer) allows for real-time control of the their respective ratios in the final electrode. Moreover, an additional benefit is that the exemplary process can be inserted in a web processing arrangement for continuous deposition of the electrode layers.

In general, the exemplary RSDT assemblies/processes of the present disclosure bypass the traditional wet chemical routes by simultaneously nucleating the catalyst on a support and by the sequential deposition of catalytic layers via a gas-phase. The improved process does not require intensive electrical power, and it harnesses the energy stored in a liquid fuel to decompose the metal organic precursor into the desired metallic or bi-metallic product. The process can also be tailored to favor both alloying and core-shell formation.

Exemplary RSDT Assembly/Process:

As shown in FIG. 1, an exemplary reactive spray deposition assembly 10 includes at least one feedstock supply container 12 connected through a pump to a nozzle assembly 14. In general, assembly 10 is configured and dimensioned for the reactive spray deposition of materials (e.g., catalyst films), where a liquid precursor solution or feedstock from container 12 is pumped through nozzle assembly 14 and mixed with a fuel and/or oxidant and ignited to form a combusted spray or flame 18 that can be directed toward a substrate 16 for deposition.

In general, the feedstock supply container 12 contains a precursor mixed with a solvent. The precursor can be an organo-metallic, inorgano-metallic species, slurries or polymeric species, etc. The solvent may be an aqueous or organic solvent and may contain an additional dissolved or liquefied gas (e.g., propane, dimethyl ether, carbon dioxide, etc.). It is noted that other different RSDT systems/assemblies are disclosed and described in U.S. Patent Publication Nos. 2008/0280056 and 2011/0212386, the foregoing being incorporated herein by reference in their entireties.

In certain embodiments, the formation of nano-crystalline particles via the exemplary assemblies/methods (e.g., via assembly 10) utilizing the improved reactive spray deposition technology (RSDT) of the present disclosure occurs through a multi-step process on a time scale of milliseconds.

In exemplary embodiments, combustion heat release of the solvent (e.g., xylene—from liquid precursor solution/feedstock from container 12) and additional fuel (e.g., CH4) drives precursor decomposition, solvent evaporation and subsequent cluster nucleation through homogeneous reactions. Surface growth and coalescence lead to the subsequent formation of nanoparticles that depending on number density, residence times, and temperature, may form agglomerates before depositing on the desired substrate 16. Typical metal precursors for reactive spray synthesis include, for example, acetylacetonates, which can be dissolved into the organic solvent for a first-stage core formation in a RSDT-based core-shell nanoparticle manufacturing process. Air-assist-based atomization has been used in assembly 10 to produce sub-micron droplets, and the assist-air pressure can be used to control droplet size and to some extent subsequent nanoparticle size. The flame heat release and the use of either oxidizing or reducing environments in the flame allows for the formation of either metallic or oxide particles, which may serve as a core for the core-shell nanoparticle structure.

Vapor-phase nucleation of the metal or metal oxide occurs along with growth of the primary particle along the length of hot reactive zone 18, and the assembly 10 is equipped with a rapid quench zone or assembly 20 that is used to arrest primary particle growth through an induced rapid cooling or to create a metastable or amorphous phase, as discussed further below. The rapid quenching gas introduced via assembly 20 can also create a non-equilibrium phase change of vapor-phase species that could be used to form an active shell structure of Pt or other active metal. In such a process, the primary particle acts as a nucleation site for a slower reacting or sequentially injected metal precursor. The later phase transition for a shell metal can also be encouraged by lower precursor concentration as well as downstream secondary injection nozzles 22 (e.g., nozzles 22 for introducing ionomer materials or other secondary materials or the like).

Several process variables can be controlled in the operation or utilization of assembly 10 to adjust the time of flight and/or temperature exposure of the solvent/precursor droplets. Process variables that control key aspects of the assembly 10, such as flame-zone temperature profile, droplet spray formation, and downstream quenching, are important for the formation of well-defined core-shell structures, as discussed further below.

Table 1 lists some key process parameters of assembly 10 that can be controlled:

TABLE 1

Key RSDT parameters and their impact on nanoparticle formation and deposition processes

| Process variables | Impacts on process outcome |
| --- | --- |
| precursor concentrations | deposition rate and nanoparticle size, structure, and morphology |
| total solution flow rate | flame residence time and nanoparticle annealing |
| atomization air flow rate | droplet and subsequent nanoparticle size |
| location of solvent injection | core particle size and shell thickness on nucleated core |
| flame equivalence ratio | temperature for annealing and degree of metal oxidation |
| quench gas flow rate and composition | nanoparticle size and degree of oxidation, shell thickness, and particle temperature for deposition on substrate |

Figure 2:
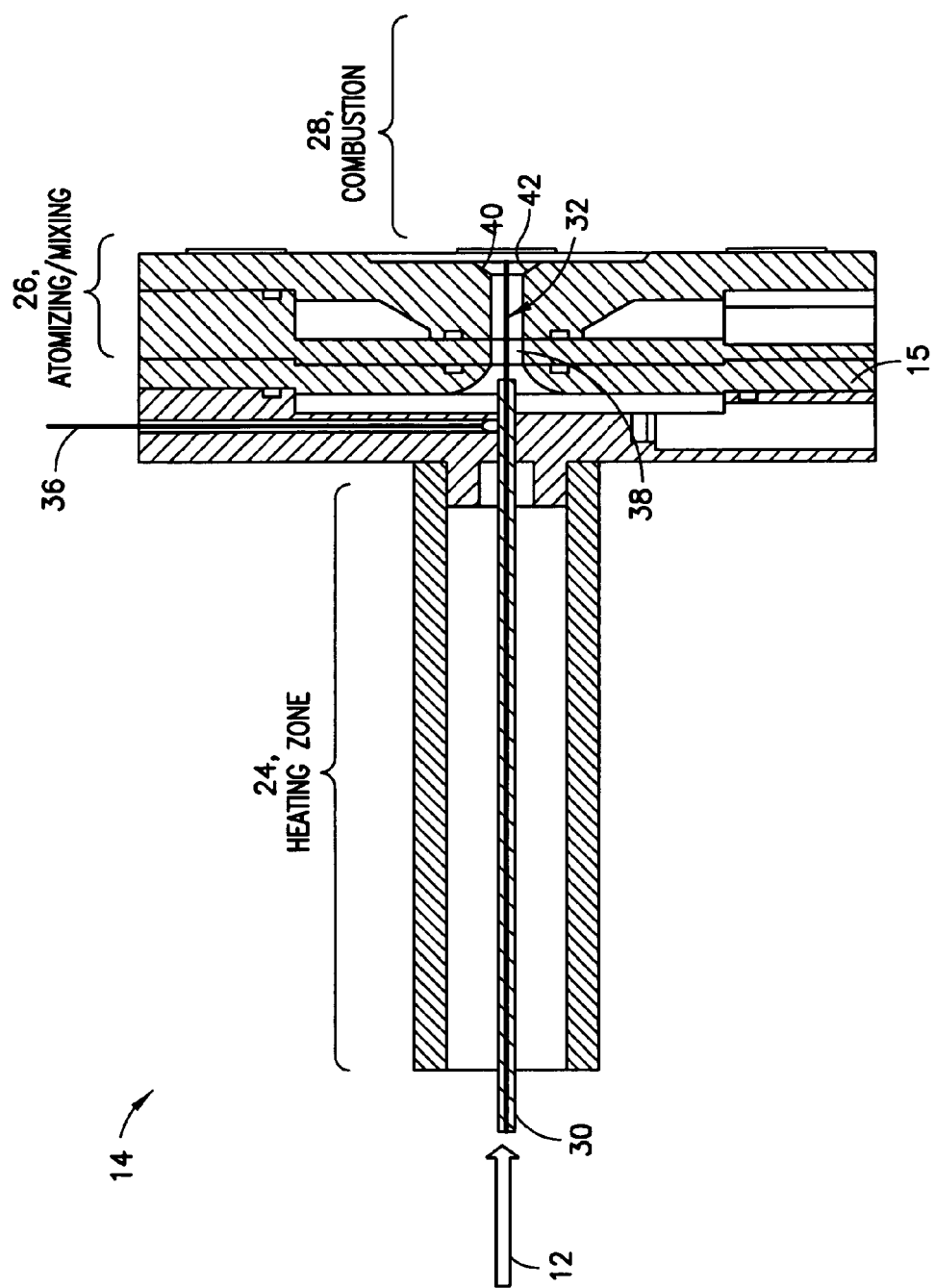
FIG. 2 is a schematic of an exemplary nozzle assembly for use in a reactive spray deposition assembly of the present disclosure.

In exemplary embodiments and as shown in FIGS. 1-2, during deposition a solution/feedstock (e.g., liquid precursor solution/feedstock) is pumped from container 12 (e.g., at a flow rate of about 4 mL/min with an Isco 500D (Teledyne Isco, Lincoln Nebr.) syringe pump) to and through nozzle assembly 14 (e.g., atomization/combustion nozzle assembly 14). In general and as shown in FIG. 2, nozzle assembly 14 includes and/or is associated with three stages: heating (heating zone 24), atomizing/mixing (atomizing/mixing zone 26), and combustion (combustion zone 28).

During the heating stage (heating zone 24) the precursor is pumped from the container 12 and into an first elongated member or tube 30 (e.g., a 316 stainless steel tube (Cadence Science, Cranston R.I.) that has an outer diameter of 0.0625" and is about 3.94" in length, and has an inner diameter of about 0.01") of nozzle assembly 14.

Mounted with respect to (e.g., soldered or secured) to the end of the first elongated member 30 is a second elongated member or tube 32 (e.g., 32 gauge 0.708" long hypodermic insert with a 0.008" outer diameter and a 0.004" inner diameter) to act as a restrictor and to induce a fast pressure drop just prior to exit into the atomizing/mixing zone 26.

The first elongated member 30 is heated (e.g., to about 190° C.) by heater 34 (e.g., by an induction heater 34 (Ameritherm, Scottsville, N.Y.)), using a control point or thermocouple 36 (e.g., a control point positioned about 3.9" from the entry of the tube 30).

Surrounding or disposed about/around the second elongated member 32 (e.g., hypodermic insert 32) is a channel 38 (e.g., Ø0.15" concentric channel) configured and dimensioned for supplying a fuel oxidant (e.g., oxygen) or the like to nozzle assembly 14. In exemplary embodiments, the second elongated member 32 is centered in the channel 38 by a guide or the like to maintain a substantially centered position relative to the channel 38. Both second elongated member 32 and channel 38 supply their contents (precursor solution/feedstock and fuel oxidant, respectively) as a substantially co-flow geometry or spray into the open atmosphere.

The precursor mixture exits the second elongated member 32 housed in the body or housing 15 of the nozzle 14 as a fine spray. In exemplary embodiments, the spray generated by nozzle assembly 14 is formed by a combination of pressure, heat, and supercritical atomization due to the expansion of the liquefied propane above its critical temperature of 96.6° C. forming droplets less than about 1 μm in diameter. In the atomizing/mixing stage 26, the oxygen and the fuel droplets (e.g., toluene and propane) are turbulently mixed prior to ignition as a pre-mixed flame. In certain embodiments, the length of the atomizing/mixing zone 26 is about 0.08" to 0.15".

Figure 3:
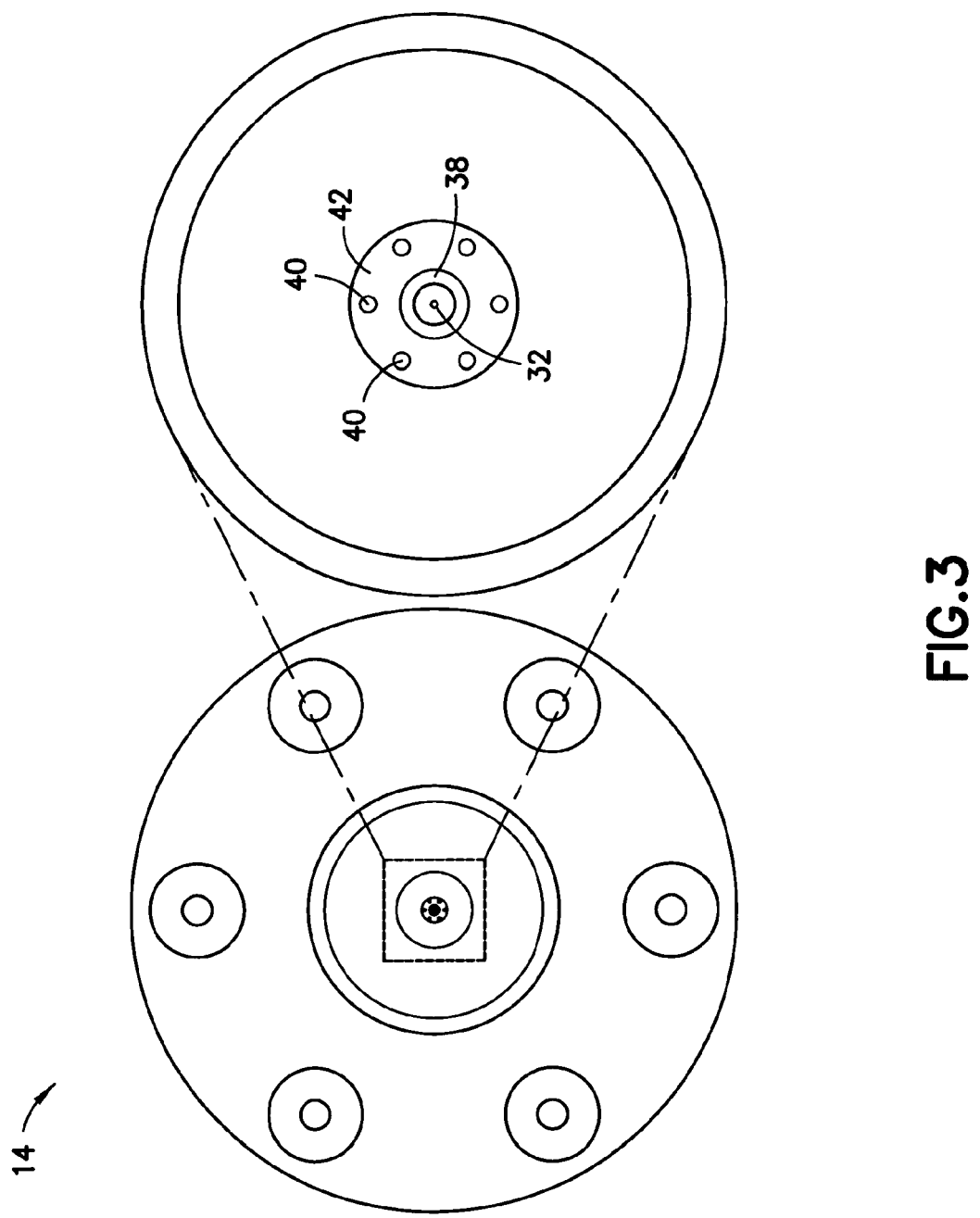
FIG. 3 is a front view of the nozzle assembly of FIG. 2.

The third and final stage of the nozzle assembly 14 is the ignition or combustion zone 28. In exemplary embodiments and as shown in FIG. 3, this portion of the nozzle assembly 14 includes one or more ports 40 (e.g., six circular ports 40 (⌀0.02")) positioned on an angled surface 42 that is angled relative to the centerline or central axis of the second elongated member 32 (e.g., angled at about 45° relative to the centerline or central axis of the second elongated member 32).

In certain embodiments, the ports 40 are positioned substantially evenly spaced apart from one another about a radius (e.g., about a 0.125" radius) around the central axis of the second elongated member 32. In general, the ports 40 are configured and dimensioned to supply a stream (e.g., a pilot gas stream, such as a pre-mixed methane and oxygen stream) that is ignited to stabilize the high exit velocity jet flame formed by the nozzle assembly 14.

After passing through the combustion zone 28, a quench assembly 20 can be utilized to dilute the gas stream and/or rapidly cool the flame. In exemplary embodiments and as shown in FIGS. 1 and 4-6 (and as discussed further below), after passing through the combustion zone 28, a substantially circular quench assembly 20 (Exair, Cincinnati, Ohio), located about 2.27" from the end of the second elongated member 32, is employed to dilute the gas stream with compressed air and rapidly cool the flame.

After passing through the quench assembly 20, the product stream consists of particles or nanoparticles (e.g., precursor material) and aggregates that impinge directly onto one of various substrates 16 located at a stand-off distance (e.g., at a stand-off distance of about 6.48").

With reference again to the configuration and geometry of the nozzle assembly 14 as shown in FIG. 3, and more particularly to the configuration of the pilot gas ports 40, fuel oxidant orifice or channel 38, and solvent/fuel orifice or opening 32, it is noted that such features can be designed and/or controlled to only inject the fuels so the droplets are formed in substantially completely reduced environments. Oxidation or reduction occurs according to the relative oxidizing strength of the flame, the activity of the metal species, and the partial pressures of $CO_2$ and $H_2O$. It is noted that the oxidizing strength can be manipulated by the $O_2$ partial pressure in the combustion atmosphere, and adjustments in the equivalence ratio. The equivalence ratio is the relationship between the stoichiometric oxidant and fuel molar flow rate divided by the actual process ratio. These can be controlled in order to have either a reducing or oxidizing flame.

With reference again to the quench assembly 20 shown in FIGS. 1 and 4-6, exemplary quench assembly 20 includes a substantially circular portion 21 that defines a substantially circular quenching zone 23. In certain embodiments, quench assembly 20 includes one or more nozzles 25 (e.g., eight air nozzles 25) that are configured and dimensioned to introduce turbulence to the flame and/or introduce vapor if needed/desired.

In certain embodiments, after the ignition zone a circular air-quench assembly 20, positioned or located (e.g., about 5-10 cm) from the end of the second elongated member 32, can be substantially centered axially on the flame. As shown in FIG. 6, the airstream from the quench follows a coanda profile 4, which directs the airstream down an angled surface of the quench assembly 20.

In operation and as shown in FIG. 6, compressed air flows through an inlet 1 of the quench assembly 20 into a chamber 2. The air is then throttled through a nozzle 3 at high velocity. A low pressure region is created in the center 5 pulling in a large volume of the surrounding air into the airstream and creating a conical 360° ring of air 6. A purpose of the air-quench is to dilute, with air at about 25° C., the combustion zone and thus rapidly cool the flame.

With a high flow of air or water and being close to the flame, the water generation in the flame can be increased to start to generate amorphous particles. For example, the electrocatalyst can be synthesized in a one-step process (e.g., by utilizing assembly 10) by directly depositing Pt (from the vapor phase) directly onto a zero-background single crystal quartz substrate (e.g., substrate 16). Pt nanoparticles, formed by decomposition in the vapor phase, grow from acetylacetonate (e.g., 2,4-pentanedionate) ligands of the Pt metal.

While passing through the quench assembly 20, the reaction zone temperature drops about 200-400° C./cm, and the luminosity of the flame is greatly diminished. The volume flow rate through the quench assembly 20 can be adjusted to rapidly cool the flame between flow rates of 30-50 L/min. The post-quench product stream consists of nanoparticles that impinge on the substrate 16.

Depending on the distance between the circular quench assembly 20 and the second elongated member 32 (e.g., hypodermic insert 32), a spectrum of structures between crystalline and amorphous can exist. Two extremes are noted by the processing conditions in Table 2.

TABLE 2

Processing conditions using RSDT assembly 10 that produce amorphous sample #145 and crystalline sample #154 films of Pt:

| Uconn sample ID# | substrate | time (s) | swept area (cm²) | stand-off distance (cm) | quench distance (cm) | substrate (° C.) | catalyst conc. (mM) | catalyst | solvent 1 (type) | solvent 1 wt. % | solvent 2 (type) | solvent 2 wt. % | solvent 3 (type) | solvent 3 wt. % | solution flow rate (mL/min) | oxident flow [$O_2$] (L/min) | quench flow [air] (L/min) |
|---|---|---|---|---|---|---|---|---|---|---|---|---|---|---|---|---|---|
| 145 | quartz | 230 | 122.5 | 17.7 | 4.9 | 115 | 10 | Pt | xylene | 62.5 | acetone | 20.8 | propane | 16.6 | 4 | 14.3-14.5 | 87.5 |
| 154 | quartz | 135 | 122.5 | 18.7 | 9.0 | 145 | 10.21 | Pt | xylene | 63.3 | acetone | 21 | propane | 18.3 | 4 | 13.8 | 37.5 |

Figure 9:
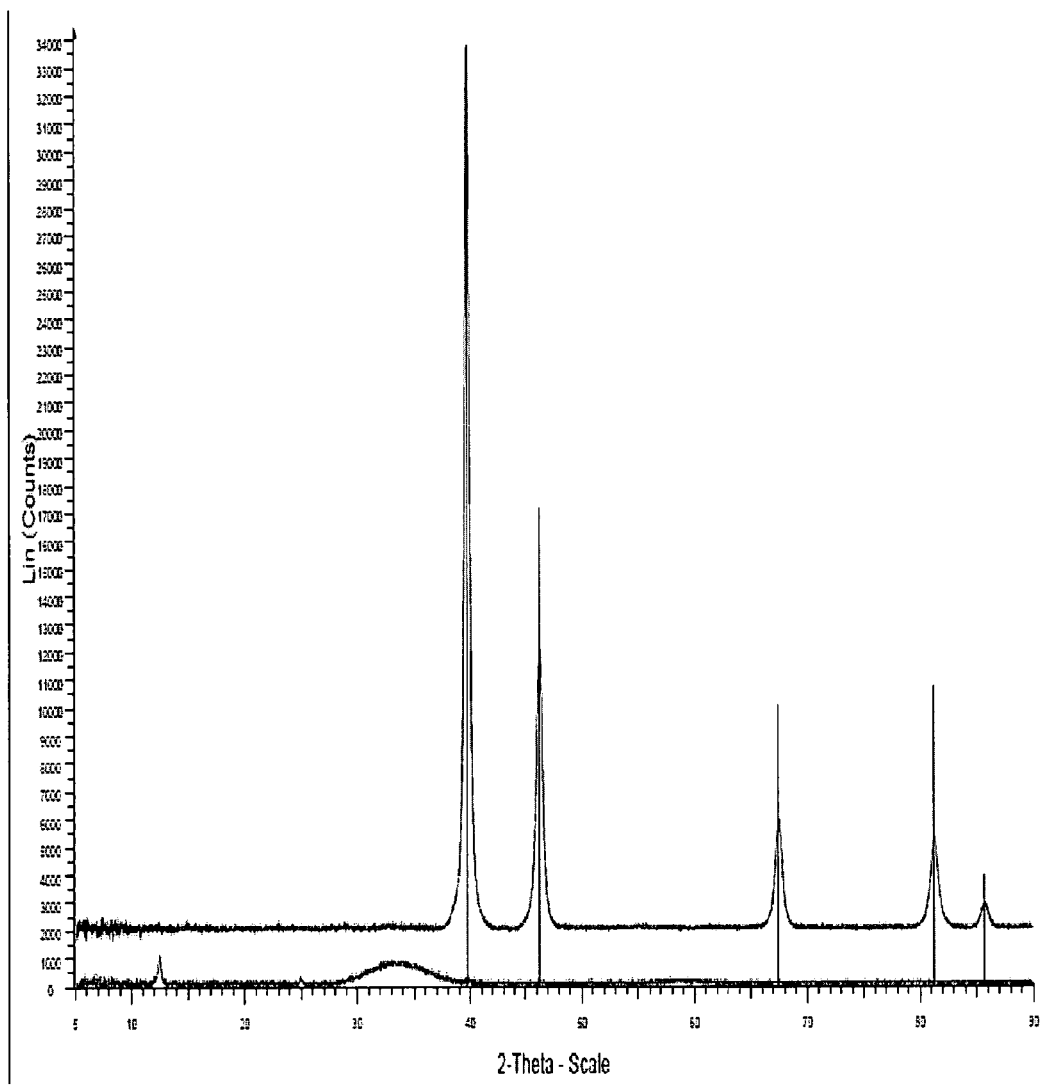
FIG. 9 is a plot showing evidence for the crystalline structure (sample #154), versus amorphous depending on the operating conditions and shows the peaks of face-centered Pt.

Evidence for the crystalline structure (sample #154) is shown in FIG. 9. More particularly, the top plot in FIG. 9 represents sample 154 deposited with a hypodermic member 32 to quench assembly 20 distance of about 9 cm. This plot clearly shows the peaks of face-centered Pt. The peaks are indexed to crystalline Pt (ICDD card #004-0802). A bottom plot shows an amorphous Pt. A range of structures between fully crystalline and amorphous can be formed by adjusting the quench distance (e.g., distance between member 32 and assembly 20) and/or flow rate of air.

In exemplary embodiments, the quench has two distinct functions: it substantially stops particle growth, and it allows a wider range of substrate materials to be positioned at lower stand-off distances. This reduction in stand-off distance is important for catalyst manufacturing directly onto polymeric electrolytes (e.g., Nafion with a glass transition point around 110° C.). While passing through the quench the reaction zone temperature drops about 200-400° C./cm and the luminosity of the flame is greatly diminished. The volume flow rate through the quench was fixed for all depositions at about 30-50 L/min. In certain embodiments, the post-quench product stream consists of nanoparticles that enter into the secondary spray zone 22.

In certain embodiments and as shown in FIG. 1, assembly 10 can include one or more humidifier nozzles 29. In general, humidifier nozzles 29 are configured and dimensioned to supply humidity (e.g., water vapor) to the substrate or membrane 16 (e.g., to the front side of membrane 16).

Figure 33:
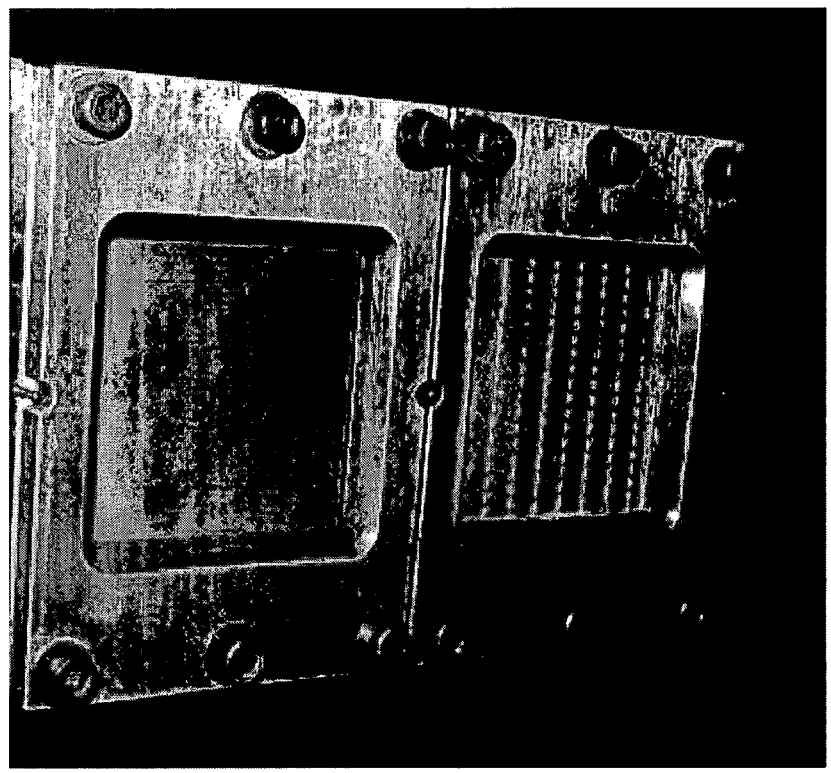
FIG. 33 shows images of exemplary substrate or membrane holders according to the present disclosure.

In some embodiments and as shown in FIG. 33, the substrate or membrane 16 of assembly 10 may be secured or mounted with respect to a substrate holder 31 or 131 or the like. In one embodiment, substrate holder 31 includes a pocket or reservoir that is configured and dimensioned to hold a liquid (e.g., phosphoric acid) to quench the substrate 16 from the back side in order to manage the loss of elasticity of the membrane 16, and/or to take away heat from the membrane 16. In another embodiment, substrate holder 131 includes a porous metal fit or section or the like that is configured and dimensioned to allow the membrane 16 to constantly soak during deposition (e.g., during an exemplary RSDT process).

Figure 7:
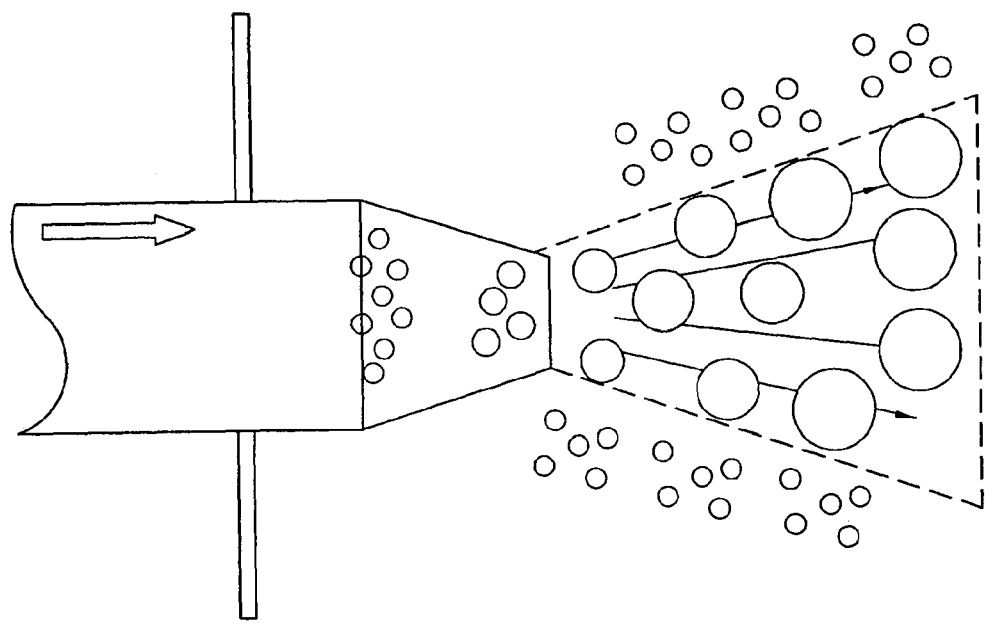
FIG. 7 shows that supercritical injection relies on flashing of a dissolved gas in the liquid whereby the atomization is governed by bubble growth rates, and the injected or dissolved gas create bubbles that form a two-phase flow regime at the injector orifice.
Figure 8:
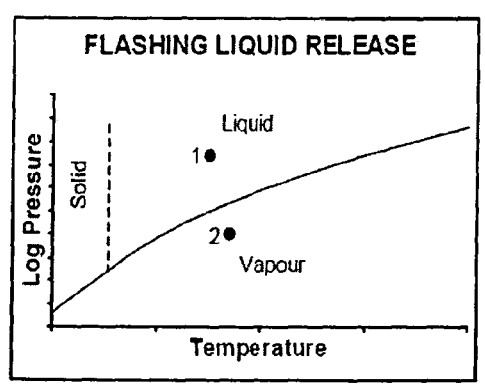
FIG. 8 is a graph showing temperature versus log pressure for flashing liquid release.

Atomization:

In general and as shown in FIGS. 7-8, supercritical injection relies on flashing of a dissolved gas in the liquid whereby the atomization is governed by bubble growth rates. The injected or dissolved gas create bubbles that form a two-phase flow regime at the injector orifice. The liquid is then squeezed by the gas bubbles into thin shreds and ligaments. When the gas bubbles emerge from the nozzle they explode causing a rapid expansion of small bubbles that shatter the surrounding liquid in the nozzle efflux. However, one of the challenges in mixing liquid and gas phase flows is the tendency of the gas phase to coalesce into larger gas bubbles, resulting in slug flow. Typical methods to combat this behavior are to improve the quality of the mix during the gas injection (bubbly mixing section) and to perform the mixing immediately upstream of the discharge nozzle.

Expansion of a pressurized liquid stream through a nozzle is the simplest form of droplet generation. Break up of sub-cooled jets due to pressurized release through a simple orifice is referred to as the mechanical break up mode of atomization. Atomization due to pressurized release of superheated liquid is termed flash atomization. For efficient disintegration of a liquid stream into droplets the inertial force exerted on the liquid should be much larger than the surface tension. The complex nature of the atomization process dictates that models are composed of correlations between appropriate dimensionless groups. The Weber number, a dimensionless number, expresses the ratio of the fluid's inertia (aerodynamic) and surface tension forces and is useful in describing the breakup of a drop in a flowing stream.

$$We = \frac{\rho v^2 l}{\sigma} \quad \text{(Equation 1)}$$

where $\rho$ is the density of the liquid, $v$ is the velocity of the liquid, $l$ is the characteristic length (droplet diameter) and $\sigma$ is the surface tension. In this case, it is assumed that the characteristic length is the droplet diameter. It is also known that the sauter mean diameter (SMD) is the diameter of a droplet whose surface-to-volume ratio is equivalent to the spray surface-to-volume ratio.

Sauter Mean Diameter:

$$D_{32} = \frac{\sum N_i D_i^3}{\sum N_i D_i^2}$$

Using this information, we can calculate the Weber number at the SMD.

$$We = \left(\frac{\rho v^2}{\sigma}\right) \frac{\sum N_i D_i^3}{\sum N_i D_i^2}$$

The above relation can be simplified if looking at a single particle instead of a number of them:

$$We = \left(\frac{\rho v^2}{\sigma}\right) \frac{D^3}{D^2} = \left(\frac{\rho v^2}{\sigma}\right) \frac{V}{A_{surf}}$$

The weber number is the ratio between the inertial and surface forces. To get atomization, the inertial forces should dominate over the surface forces. Therefore, assuming We>1:

$$\text{atomization} = \left(\frac{\rho v^2}{\sigma}\right) \frac{V_d}{A_{surf\,d}} > 1$$

This relation reveals a pretty clear description of atomization. For a given liquid, as the volume of the droplets increase and velocity of the droplets increase, atomization also increases. However, as droplet surface tension or surface area increase, the atomization rate decreases.

The sauter mean diameter (SMD), $D_{32}$, is defined as the diameter of a droplet whose surface-to-volume ratio is equal to that of the entire ensemble (spray) and is a widely used descriptor in processes requiring efficiency studies, mass transfer and reactions.

$$D_{32} = \frac{\sum N_i D_i^3}{\sum N_i D_i^3} \quad \text{(Equation 2)}$$

where $N_i$ is the number of droplets in size range i, and $D_i$ is the middle diameter of size range i. A complete description of a spray requires two parameters to express a representative diameter and the other to measure the range of drop sizes. The mean droplet size of a spray produced by mechanical break-up is also a function of the exit velocity, owing to the increase in turbulence as the Reynolds number increases, and the exit orifice size, $d_o$. Combined orifice geometry shape factors, such as the length $L/d_o$ ratio where L is the length from the exit orifice to the nearest upstream expansion also influence the atomization process. Flash atomization on the other hand is dependent upon thermofluid mechanisms different from mechanical break-up with the degree of superheat driving this mechanism. At higher degrees of superheat, droplet breakup occurs by the flashing action of evaporating liquid or by flashing breakup. In many systems the two models of mechanical breakup and flashing breakup occur in parallel.

The present disclosure will be further described with respect to the following examples; however, the scope of the disclosure is not limited thereby. The following examples illustrate the advantageous systems/methods of the present disclosure of fabricating improved films/coatings (e.g., catalytic films/coatings).

Example 1

Activity and Microstructure of Oxygen Evolution Anodes Prepared by a Direct Dry Deposition Technique In general, electrolysis of water requires electrode layers composed of optimally placed catalyst to accelerate the electrochemical reaction rates, ionomer to supply protons, and pores to allow product/reactant flow from/to the catalyst surface. Some catalysts used for $H_2$ evolution at the cathode consist of platinum and palladium black or platinum dispersed on carbon. The $O_2$ evolution at the anode may suffer from large overpotential losses and durability issues that affect the efficiency and stability of this electrode. This electrode must endure high potentials (>2V) and an acidic environment. Under these conditions carbon is easily oxidized and above (1.5 V) noble metals such as Pt and Pd are also corroded.

Stable catalytic candidates for the anode include $IrO_2$, $Ir_xSn_{(1-x)}O_2$ and $Ir_xRu_{(1-x)}O_2$. Moreover, $Ir_{0.5}Ru_{0.5}O_2$ has shown promising performance in both linear sweep voltammetry and 5 $cm^2$ PEM cells.

Building on catalyst development for the oxygen reduction reaction using platinum condensed onto carbon and on tin oxide materials for ethanol oxidation, embodiments disclosed herein extend a direct dry deposition technique directly onto the electrolyte in a catalyst coated membrane configuration (CCM) by an exemplary Reactive Spray Deposition Technology (RSDT) process.

Figure 12:
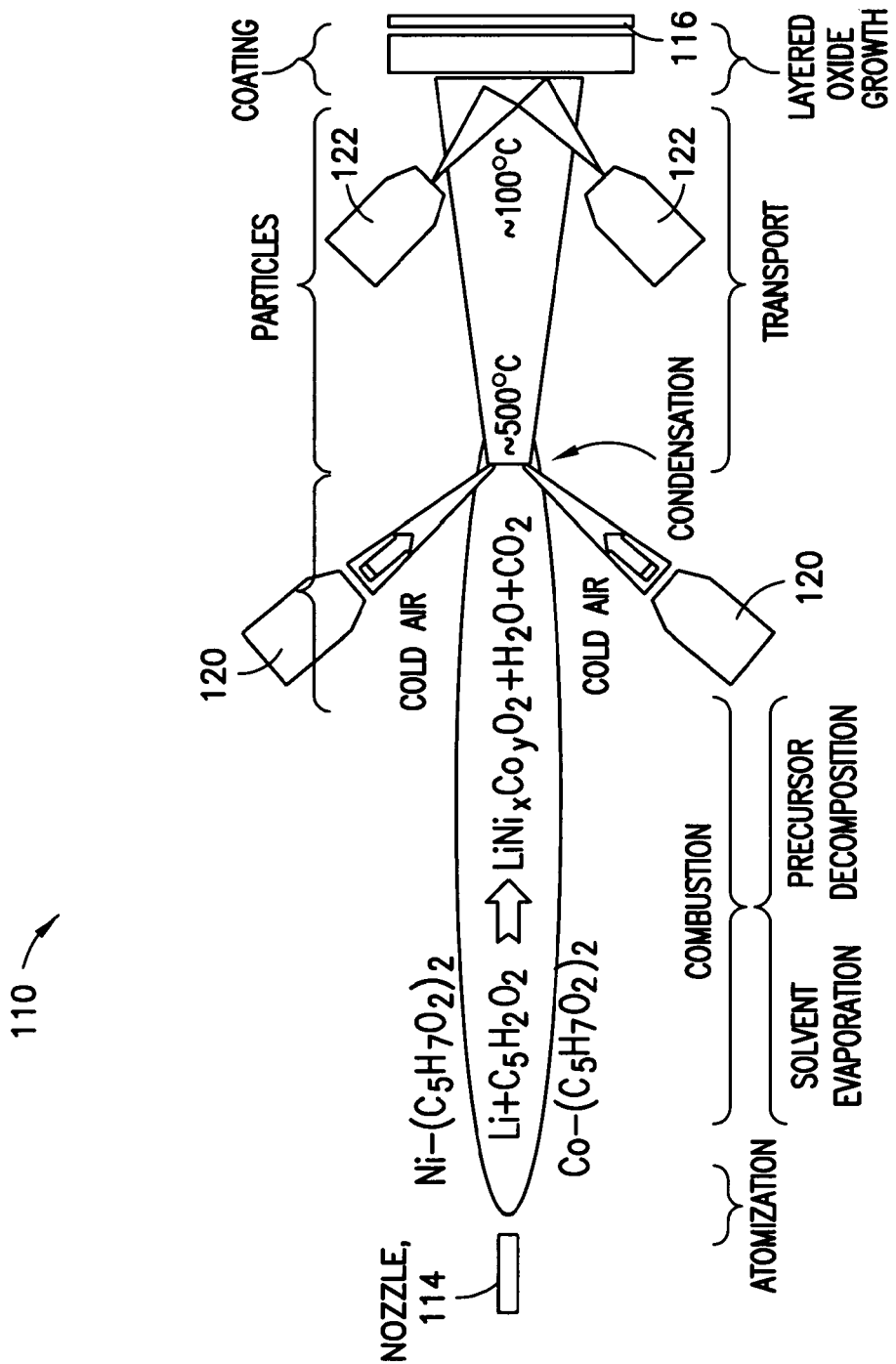
FIG. 12 is an overview of another exemplary embodiment of a reactive spray deposition assembly of the present disclosure.

In exemplary embodiments of the present disclosure, the requisite binary catalysts are generated in vapor form from a metal-organic complex dissolved in a solvent that is then finely atomized. The solvent doubles as the fuel for the flame. The atomized spray is combusted and metal oxide vapors are generated. In exemplary embodiments, the vapors are then rapidly solidified from the gaseous phase by the use of an external quench system that rapidly cools the flame. The assembly and process is depicted in FIG. 12, as discussed in further detail below.

In exemplary embodiments, the present disclosure provides for the fabrication of low loaded platinum group metal (PGM) catalysts by an exemplary RSDT process for use as catalytic oxygen evolution anodes. Observations on the physical, microstructural and electrochemical properties of the exemplary RSDT produced catalysts have been performed, along with 25 $cm^2$ electrochemical full cell tests.

Example 2

Direct Dry Formation of Cathode Materials for Space Deployable Lithium-Ion Batteries—Exemplary RSDT Processes/Assemblies Applying $LiCoO_2$ with Different Spray Conditions on Aluminum Material Space exploration under NASA's Science Mission Directorate (SMD) requires energy storage devices capable of handling the harsh conditions of space and can integrate with primary energy harvesting devices (e.g., solar arrays). Some lithium ion batteries are suited to this task as rechargeable (secondary) batteries, but still have not realized their full potential in terms of durability, manufacturability and/or power density.

In certain embodiments, the present disclosure addresses these limitations by decreasing both the electrode thickness and cathode particle size by utilizing a novel dry and direct one-step deposition of ultra-thin layers (e.g., 1-2 µm) of nanosized mixed nickel cobalt oxide cathode particles onto a rolled aluminum foil by use of a flame combustion process.

In exemplary embodiments and as shown in FIG. 12, the process/assembly 110 utilizes an organic liquid that acts as both a solvent for the inexpensive transition metal precursors (e.g., nickel and cobalt precursors) and as the fuel to provide the enthalpic heat required for their decomposition into vapors and finally deposition. Adequate thermal control of the current collecting aluminum substrate 116 can be achieved via an air quenching mechanism 120 coupled with a secondary non-combusted spray stream 122 containing a carbon electronic conductivity enhancer. As shown in FIG. 12, reactive spray deposition assembly 110 includes a nozzle assembly 114, and may generally operate similarly to assembly 10 and/or nozzle assembly 14 as described and disclosed above, although the present disclosure is not limited thereto. Rather, assembly 110 and/or nozzle assembly 114 may take a variety of suitable forms.

Reducing the thickness of the cathode by up to an order of magnitude and producing three-dimensional electrodes architectures, not attainable by current tape casting methods, facilitates faster Li ion diffusion and reduced ohmic resistance while still providing ample storage capacity. The nano-dimensional size of the produced cathode particles increases the available surface area of crystallites and thus produces more entry paths for the diffusing Li species. Additionally, shorter diffusional lengths for the lithium-ion travelling from the particle core to the surface of the 10-20 nm cathode particles enhance the power density currently attainable by existing technologies. The nano-dimensions of the cathode facilitate faster Li ion diffusion (higher power density), and also enable better strain accommodation for volumetric expansion/contraction during charge/discharge to extend the cathode lifetime.

Figure 13A:
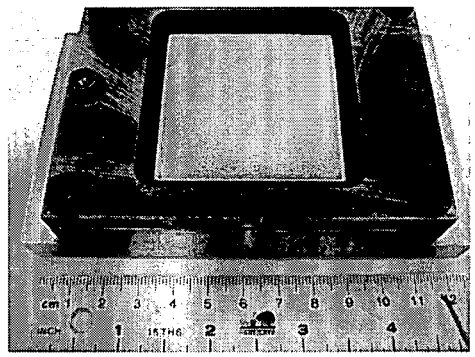
FIGS. 13A and 13B depict images of applied $LiCoO_2$ on aluminum material according to exemplary embodiments of the present disclosure, including 30 minutes deposition time and 600° C. deposition temperature by exemplary RSDT assembly/method.
Figure 13B:
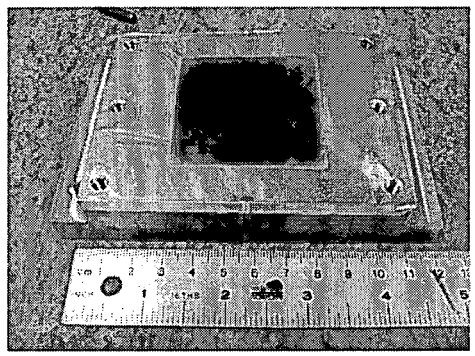

FIGS. 13A and 13B depict images of applied $LiCoO_2$ on aluminum material according to exemplary embodiments of the present disclosure, including 30 minutes deposition time and 600° C. deposition temperature by exemplary RSDT assembly/method.

Figure 14A:
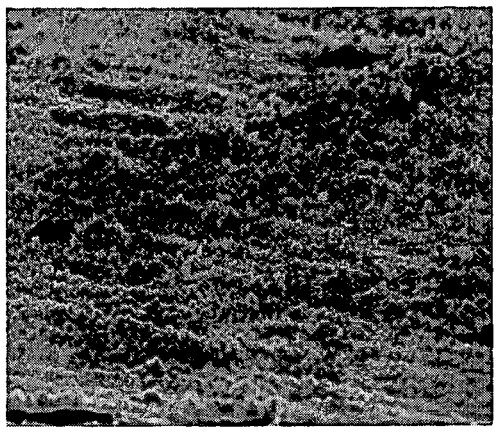
FIGS. 14A-14B depict SEM images of a $LiCoO_2$ structure fabricated according to exemplary embodiments of the present disclosure, and showing images of 9 cm×6 cm substrate movement (55 cm$^2$), $T_{substrate}$=500-600° C. [Li and Co=6.0 mM]
Figure 14B:
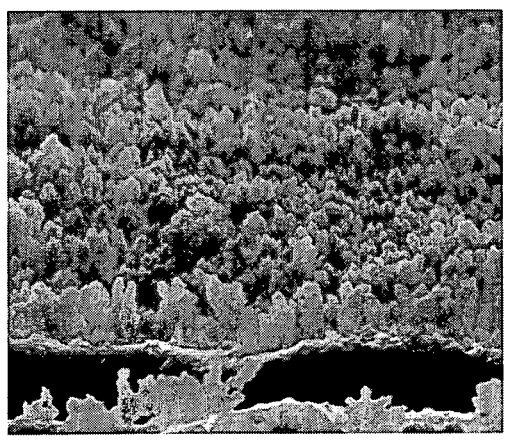

FIGS. 14A-14B depict SEM images of a $LiCoO_2$ structure fabricated according to exemplary embodiments of the present disclosure, and showing images of 9 cm×6 cm substrate movement (55 $cm^2$), $T_{substrate}$=500-600° C. [Li and Co=6.0 mM].

Figure 15:
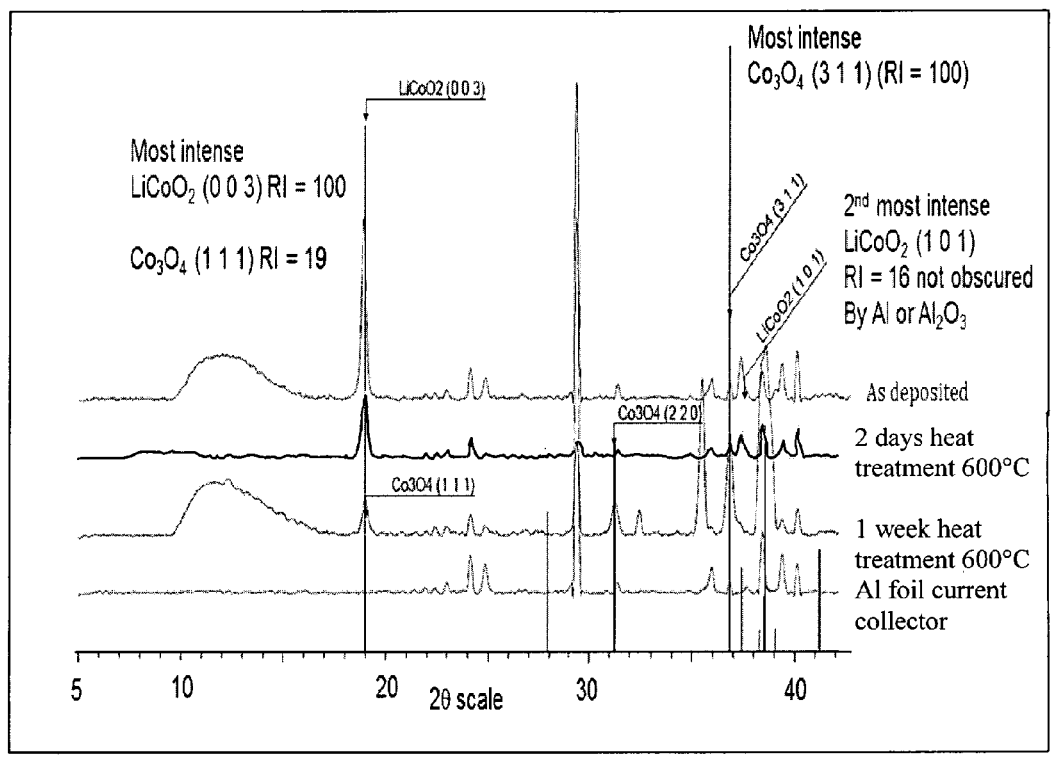
FIG. 15 depicts an X-ray of an exemplary $LiCoO_2$ structure after deposition and heat treatment.
Figure 16:
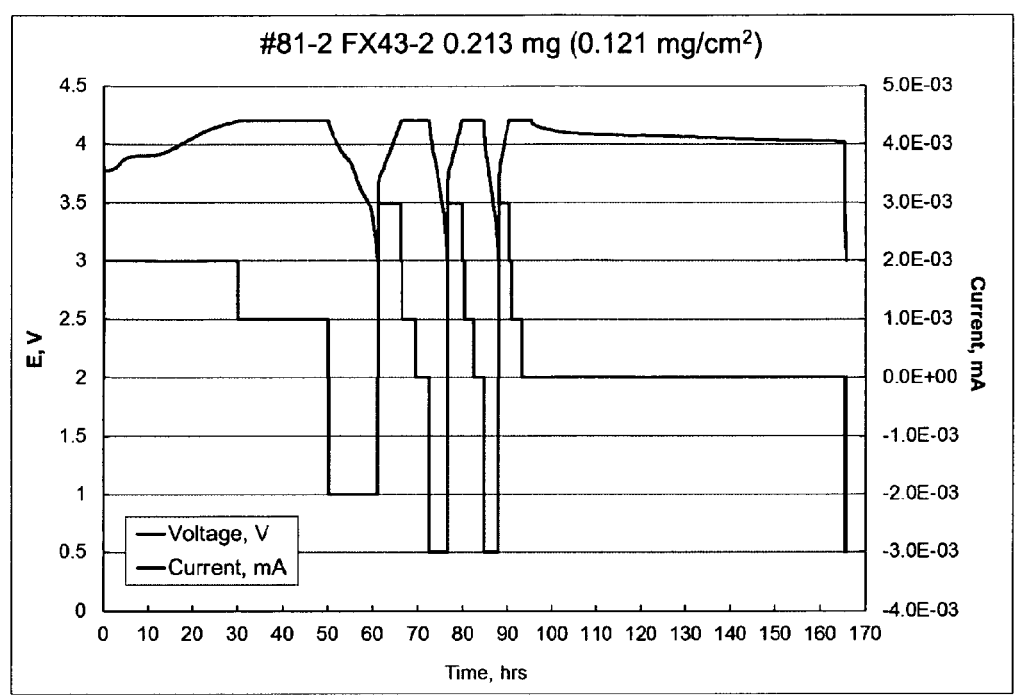
FIG. 16 shows $LiCoO_2$ charge-discharge capacity for low loading 0.121 mg/cm2 and thin electrode 1-2 micron.

FIG. 15 depicts an X-ray of an exemplary $LiCoO_2$ structure after deposition and heat treatment. FIG. 16 shows LiCoO$_2$ charge-discharge capacity for low loading 0.121 mg/cm2 and thin electrode 1-2 micron.

Example 3

Microstructure of Low-Pt-Loaded Catalysts Dispersed Via a Dry One-Step Process onto Corrosion-Resistant Supports Carbon-supported Pt electrocatalysts used in a PEMFC catalyst layer are arguably the most significant component affecting cost, performance, robustness and/or durability of the membrane electrode assembly (MEA). Some conventional MEAs are based on finely dispersed Pt nanoparticles supported on carbon black and dispersed as ink. Corrosion of the carbon support leads to poor durability and unacceptable lifetimes. During ink fabrication, the colloidal solution of carbon/Pt and ionomer self-organizes into phase-segregated regions with interpenetrating percolating phases for the transport of electrons, protons and gases. The process of microstructure formation depends on the type of catalyst support, the type and amount of ionomer added, the type of dispersion medium used during ink preparation, and the fabrication conditions. Limitations to this approach have been observed. For catalyst layers, one objective is to obtain the highest current density with respect to the desired electrochemical reactions using a minimum amount of the Pt catalyst. This requires a large active surface area with appropriately engineered microstructure, optimal orientation of the Pt crystal facets, small kinetic barriers to bulk transport and interfacial transfer of protons, electrons and reactant gases, and proper management of product water and waste heat.

In order to address such challenges, the present disclosure provides advantageous assemblies and methods for the fabrication of thin, low Pt loaded catalysts by an exemplary Reactive Spray Deposition Technique (RSDT). This one-step direct catalyst coated membrane (CCM) process enables a decoupling of all three catalyst layer components (e.g., Pt, carbon, and nafion). Moreover, the ability to introduce components separately into the hot-dry process stream allows for flexibility in manufacturing hereto unavailable via wet processing techniques.

Observations on the exemplary catalysts have been made. The thermal history of the forming catalyst particle is expected to affect the crystal structure of the formed catalyst. Particle size, distribution, and dispersion on carbon support ranges from adatoms to highly crystalline particles due to sublimation and subsequent coarsening in the process stream. Further work has been done to disperse the catalyst onto supports other than Vulcan XC-72R that show promising durability. The microstructure and oxygen reduction reactivity has been examined on a highly graphitized carbon support from Cabot, as well as on Ebonex which contains sub-oxides of titanium (Magneli phases). Catalyst dispersion, electrochemical activity and electrode formation have also been evaluated.

Example 4

Method for Controlling the Pore Size and Pores Size Distribution—Control of the Porosity in Catalyst Film Deposited by Exemplary RSDT Process/Assembly Investigations have been made on the influence of ionomer/carbon (I/C) weight ratios on the surface area, pore size distribution and morphology of PEMFC CLs, and to obtain a better understanding of the formation of the pore network in the exemplary RSDT processes of the present disclosure.

Figure 10A:
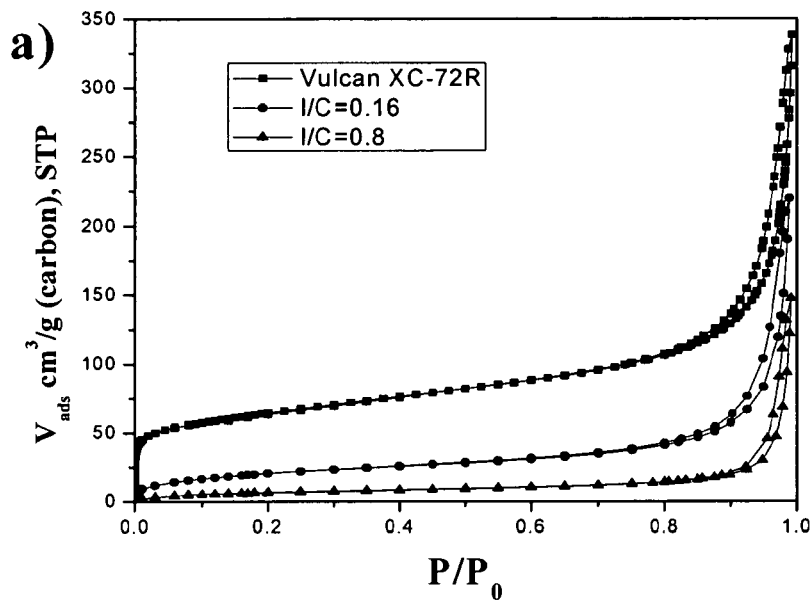
FIGS. 10A-B show a comparison of nitrogen adsorption isotherm of: a) VC and VC CCM, and b) KB and KB CCM with i/c=0.16 and 0.8.
Figure 10B:
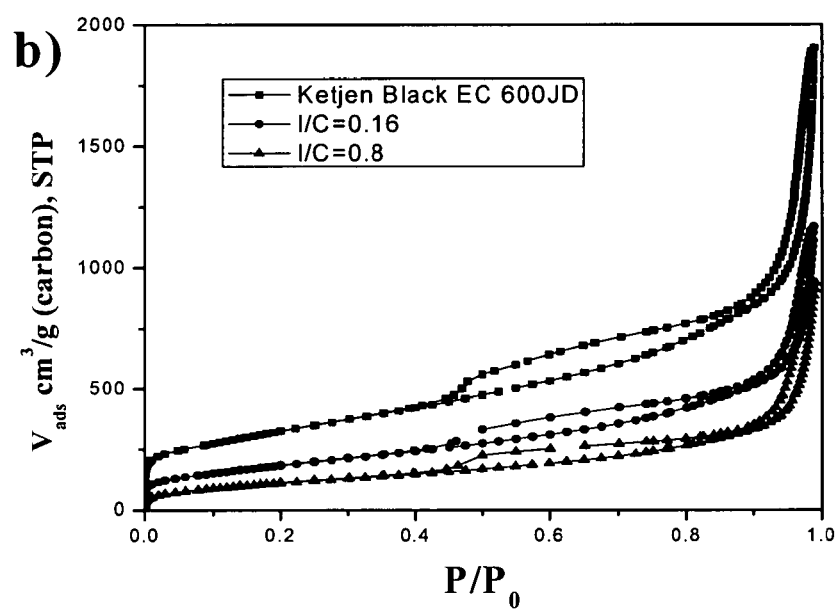

Nitrogen adsorption has been performed on two types of carbon (Ketjen Black and Vulcan) as well as CCMs, and the adsorption isotherms are shown in FIGS. 10A-B. More specifically, FIGS. 10A-B show a comparison of nitrogen adsorption isotherm of: a) VC and VC CCM, and b) KB and KB CCM with i/c=0.16 and 0.8.

Both carbons and CCMs exhibit Type II isotherm (Lowell & Shields, 1979) which suggests a structure primarily of mesopores. The adsorption isotherm rises nearly vertically indicating the fast formation of a nitrogen monolayer in the micropores. After the first inflection point of the isotherm, the adsorption volume increases almost linearly due to the filling of mesopores forming second and higher layers of nitrogen. Capillary condensation in macropores occurs toward saturation pressure of nitrogen with the sudden increase of adsorption volume. There is only little hysteresis between adsorption and desorption curves for Vulcan or Vulcan CCM. However, Ketjen Black and Ketjen Black CCM are showing H3 hysteresis with a steep adsorption branch and a sloping desorption branch at intermediate pressure (at P/P$_0$=0.45). The isotherm of CCMs in both types of carbon shows a reduced ability of adsorption (FIGS. 10A-B). The initial fast adsorption in the P/P$_0$<0.01 region of Vulcan CCMs is less pronounced than in Vulcan, implying that Pt nanoparticles (ranging from 2-4 nm diameter) filled the micropores of Vulcan. The mesopores, instead, are filled by Nafion ionomer, and the slope and the adsorption volume in the intermediate pressure range decrease with the increase of ionomer content. The same trend was observed with Ketjen Black CCMs, but the hysteresis remains.

Figure 11A:
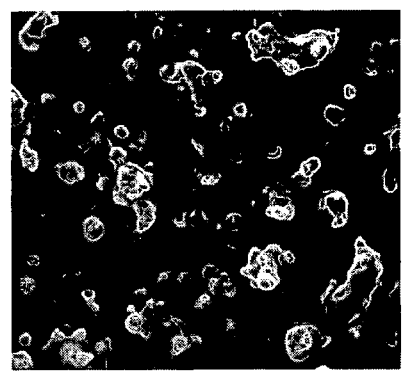
FIG. 11A is an SEM image that shows Pt/Kejten Black surface at 1000× with I/C 0.16.
Figure 11B:
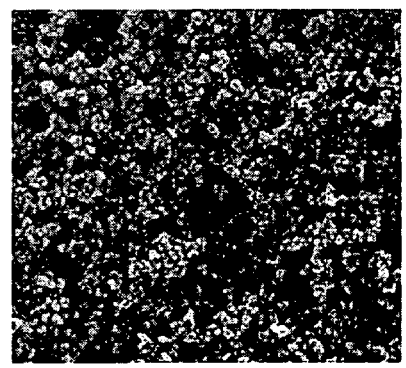
FIG. 11B is an SEM image that shows Pt/Kejten Black surface at 100 k× with I/C 0.16.
Figure 11C:
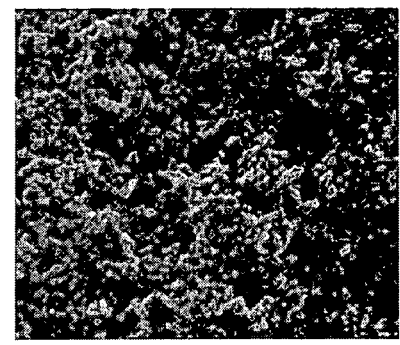
FIG. 11C is an SEM image that shows Pt/Kejten Black surface at 1000× with I/C 0.8.
Figure 11D:
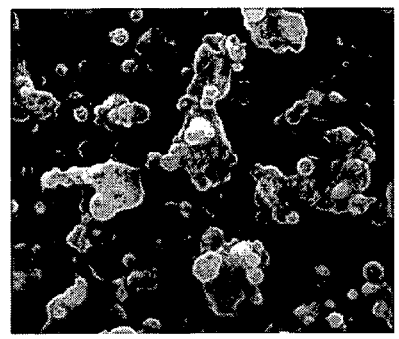
FIG. 11D is an SEM image that shows Pt/Kejten Black surface at 100 k× with I/C 0.8.
Figure 11E:
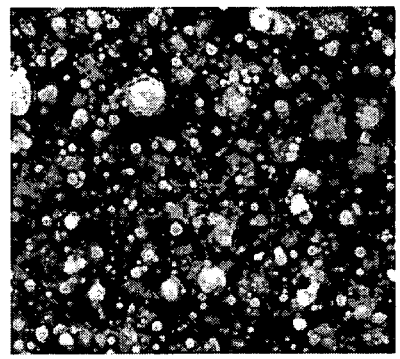
FIG. 11E is an SEM image that shows Pt/Vulcan surface at 1000× with I/C 0.16.
Figure 11F:
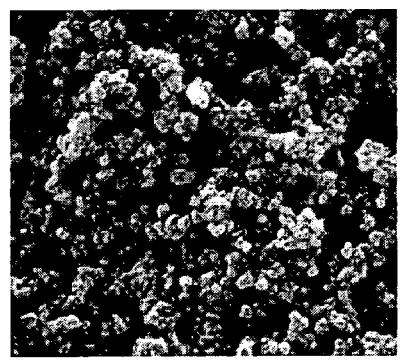
FIG. 11F is an SEM image that shows Pt/Vulcan surface at 100 k× with I/C 0.16.
Figure 11G:
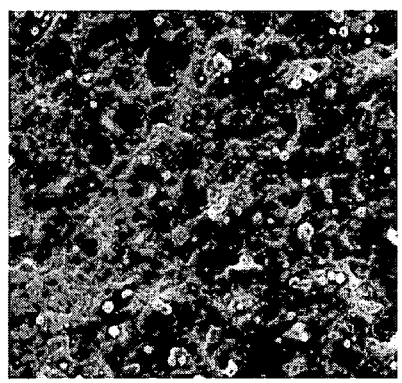
FIG. 11G is an SEM image that shows Pt/Vulcan surface at 1000× with I/C 0.8.
Figure 11H:
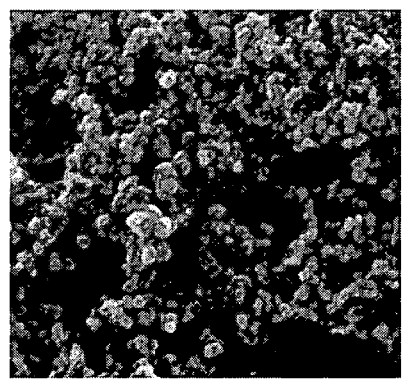
FIG. 11H is an SEM image that shows Pt/Vulcan surface at 100 k× with I/C 0.8.

For the high magnification images (SEM images of Pt on carbon surface of glassy carbon under 1000× and 100 k× magnification) shown in FIGS. 11A-11, Pt/Ketjen Black and Pt/Vulcan are showing similar agglomerates of primary carbon particles forming mesopores. More specifically, FIG. 11A shows Pt/Kejten Black surface at 1000× with I/C 0.16, FIG. 11B shows Pt/Kejten Black surface at 100 k× with I/C 0.16, FIG. 11C shows Pt/Kejten Black surface at 1000× with I/C 0.8, FIG. 11D shows Pt/Kejten Black surface at 100 k× with I/C 0.8, FIG. 11E shows Pt/Vulcan surface at 1000× with I/C 0.16, FIG. 11F shows Pt/Vulcan surface at 100 k× with I/C 0.16, FIG. 11G shows Pt/Vulcan surface at 1000× with I/C 0.8, and FIG. 11H shows Pt/Vulcan surface at 100 k× with I/C 0.8.

The primary particles of Ketjen Black are smaller compared to Vulcan. What is unique for Pt/Ketjen Black with I/C=0.8 is that a lot of bright dots appear and form a sharp contrast against the grey carbon particles. Similar SEM images have been reported where Pt dots could be observed on graphite films, hollow graphite spheres and carbon nanofibers.

By measurement, the overall pore volume of Ketjen Black is much higher than Vulcan. The particle size distribution (PSD) below 5 nm are the pores formed by aggregation of primary carbon particles and the larger diameter pores are formed by the agglomerates of secondary carbon particles. Ketjen Black exhibits a strong pore diameter distribution around 3.4 to 4 nm and also a secondary distribution at 40-60 nm, which belongs to mesopores as confirmed in the adsorption isotherm. The strong peak decreases when Pt nanoparticles and ionomer is incorporated in the film, but the peak pore volume remain the same with different I/C ratios. As the Pt loadings for all of the samples are quite close, it is noted that the reduction of peak height only related to the filling of Pt nanoparticles.

Example 5

Core-Shell Nanoparticle Fabrication and Deposition Synthesis by Flame Based Process In general, flame-based or reactive spray synthesis of nanoparticles relies on combustion of a fuel and solvent as a thermal energy source that drives particle nucleation. Annealing occurs either by reaction of precursor gases (gas-to-particle conversion) or by evaporation and/or reaction of suspended precursor particles or droplets (particle-to-particle conversion) in gas streams. The exemplary RSDT assemblies/methods of the present disclosure avoid the wet chemistry byproducts and the associated nanoparticle separation/purification steps necessary for separate catalyst deposition. In the flame-based process, the distribution of two or more components in the synthesized nanoparticles depends on precursor mixing during particle nucleation and growth. Similar evaporation, conversion, and nucleation rates favor more homogeneous distributions, whereas sequential layers of metal components can occur when two solvent or precursors have large differences in volatility. For scalable manufacturing, reactive spray deposition (RSDT) also provides adjustable process variables such as flame temperature, stoichiometry, residence time, and downstream quenching rates that couple with solvent and metal precursor concentrations to affect particle growth, annealing, and oxidation state.

Some exemplary flame synthesis assemblies of the present disclosure for RSDT development enclose a fuel-rich flame in a thin blanket of $H_2$ or inert gas (such as $N_2$) to promote fully reduced metallic core particle growth and nucleation and minimize oxidation.

Figure 17:
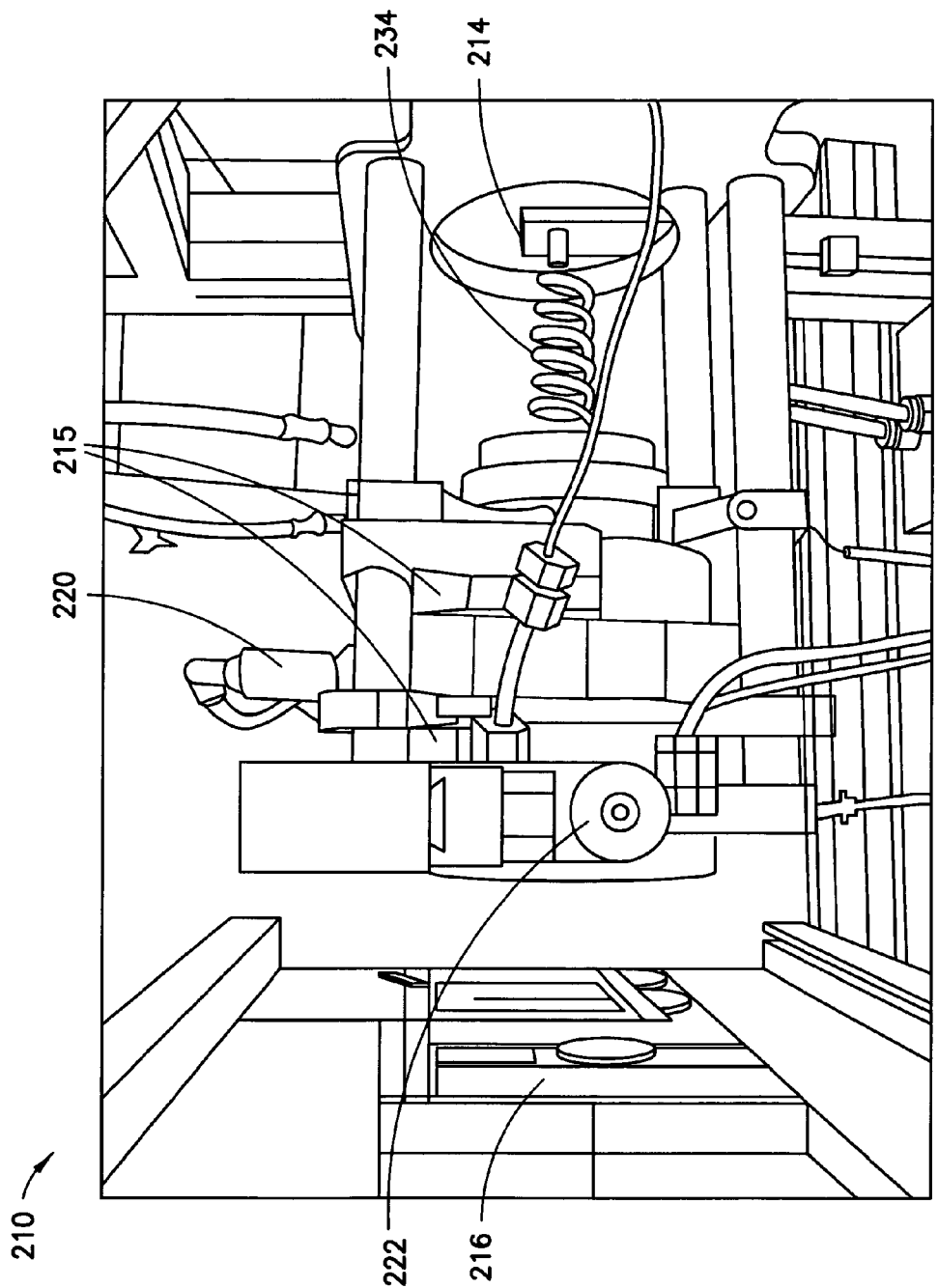
FIG. 17 is an overview of another exemplary embodiment of a reactive spray deposition assembly of the present disclosure.

FIG. 17 depicts an image of an exemplary reactive spray deposition assembly 210 set-up during a deposition. As shown in FIG. 17, the distances shown are from substrate 216 to an end of the shroud 215 (1.92 in), and from the end of shroud 15 to an end of the nozzle assembly 214 (5.09 in), respectively. In exemplary embodiments, assembly 210 includes an atomizing nozzle 214, an induction coil or heater 234, a shroud 215 to flow controlled gases $H_2$ and $N_2$, a quench assembly 220, and a second set of nozzles 222 to deposit secondary matter.

It is noted that assembly 210 includes a nozzle assembly 214, and may generally operate similarly to assembly 10 and/or nozzle assembly 14 as described and disclosed above, although the present disclosure is not limited thereto. Rather, assembly 210 and/or nozzle assembly 214 may take a variety of suitable forms.

In exemplary embodiments, two proposed methods drive the formation of core-shell nanoparticle structures. One method involves sequential precursor injections with controlled stoichiometry to manufacture the core-shell nanoparticles. A second preferred method involves controlling the solvent chemistry with appropriate reducing agents and additives. This method employs fine temperature and gas phase stoichiometry to encourage sequential nucleation of materials in order to achieve desired core-shell nanoparticle structures.

Figure 18:
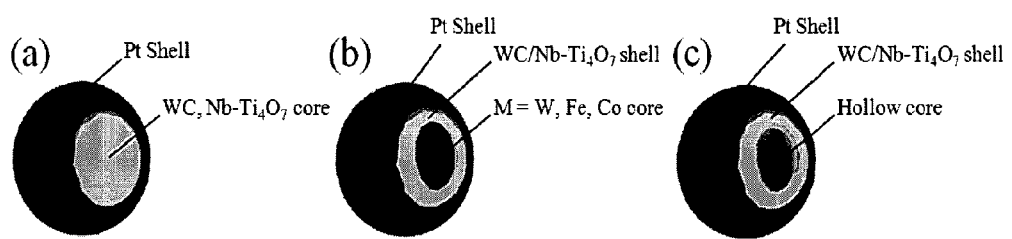
FIG. 18A-C display several annotated conceptual illustrations of: (a) Pt—WC and Pt—Nb-doped $Ti_4O_7$ core shell catalysts, (b) Pt—WC-M dual core catalysts, and (c) Pt—WC hollow core catalysts to be prepared by exemplary RSDT synthesis according to the present disclosure.

It is noted that the number of core-shell catalyst material sets for developing the scalable fabrication are innumerable. Three types core-shell catalysts were investigated for electrolyzer and fuel cell application, as illustrated in FIGS. 18A-18C. More specifically, FIGS. 18A-C display annotated conceptual illustrations of: (a) Pt—WC and Pt—Nb-doped $Ti_4O_7$ core shell catalysts, (b) Pt—WC-M dual core catalysts, and (c) Pt—WC hollow core catalysts prepared by exemplary RSDT synthesis according to the present disclosure.

For the Pt—WC and Pt—Nb-doped $Ti_4O_7$ catalysts, illustrated in FIG. 18A, the core and shell radii was independently controlled, with the shell thickness being increased from a single monolayer to 5 atomic layers. In both systems, increasing the core radius with a constant monolayer shell reduces strain while preserving purely electronic effects. On the other hand, increasing the shell thickness concomitantly accomplishes both. In addition, WC and Nb—$Ti_4O_7$ provide two different types of geometric strain. For hexagonal WC, lattice mismatch from the difference in size between Pt and W, and crystallographic mismatch with face centered-cubic platinum are both at work. However, $Ti_4O_7$ is cubic, eliminating crystallographic strain effects. The core catalysts, illustrated in FIG. 18B, allow for fine tuning of the electronic effect through interaction of the WC layer with M; it also provides a unique opportunity for the use of very inexpensive materials as the "bulk" of the catalyst, which is of particular interest many industrial entities. Finally, the present disclosure proposes to prepare hollow core, illustrated in FIG. 18C. This system provides an opportunity to control the electronic interaction between Pt and the support through the coordination of the core atoms.

Figure 19:
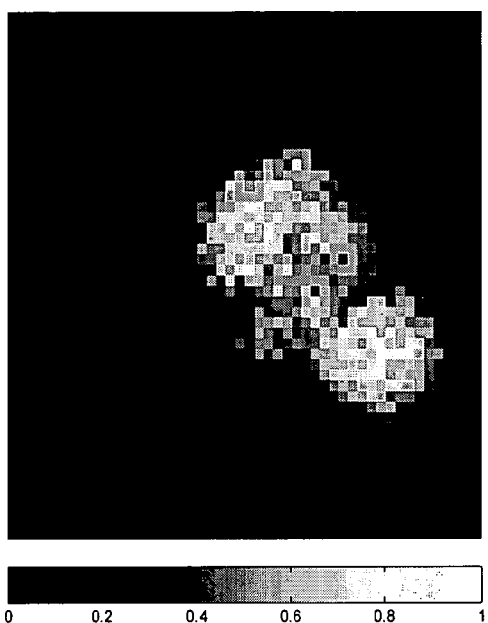
FIG. 19 depicts a TEM image of an exemplary RSDT core-shell particle according to the present disclosure.

FIG. 19 depicts a TEM image of an exemplary RSDT core-shell particle according to the present disclosure (e.g., Ti—Fe—O component).

The structure and surface chemistry of the core-shell materials are characterized using a combination of electron microscopy and a suite of surface analysis tools (XPS, BET, etc.). The effect of the catalyst support material on the electronic structure of Pt was investigated for each catalyst-support system.

Figure 20:
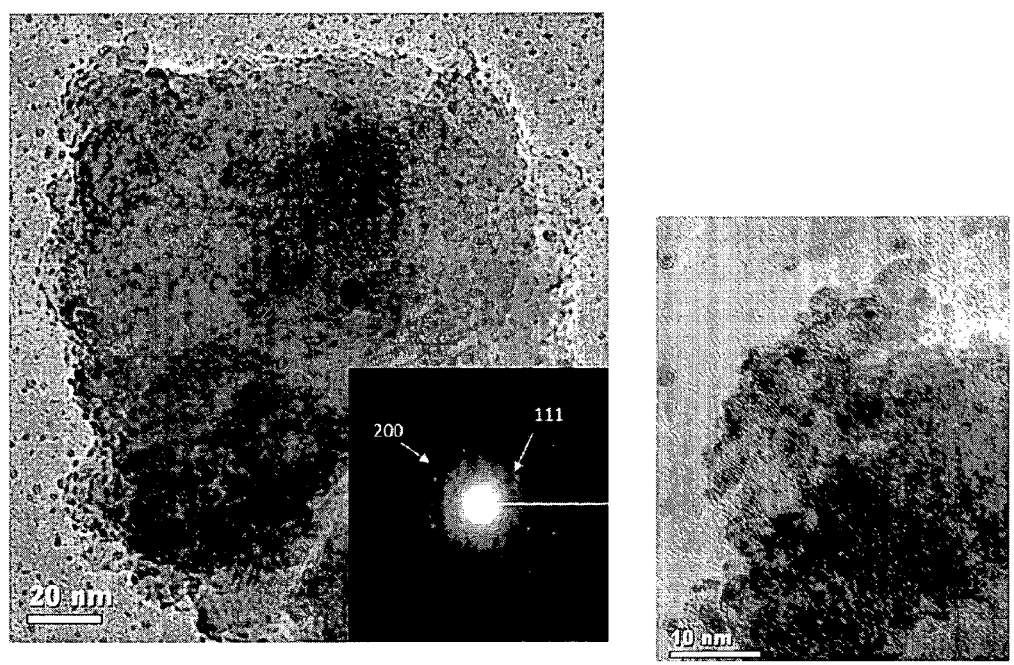
FIG. 20 depicts images of Pt on $Ti_4O_7$.
Figure 21:
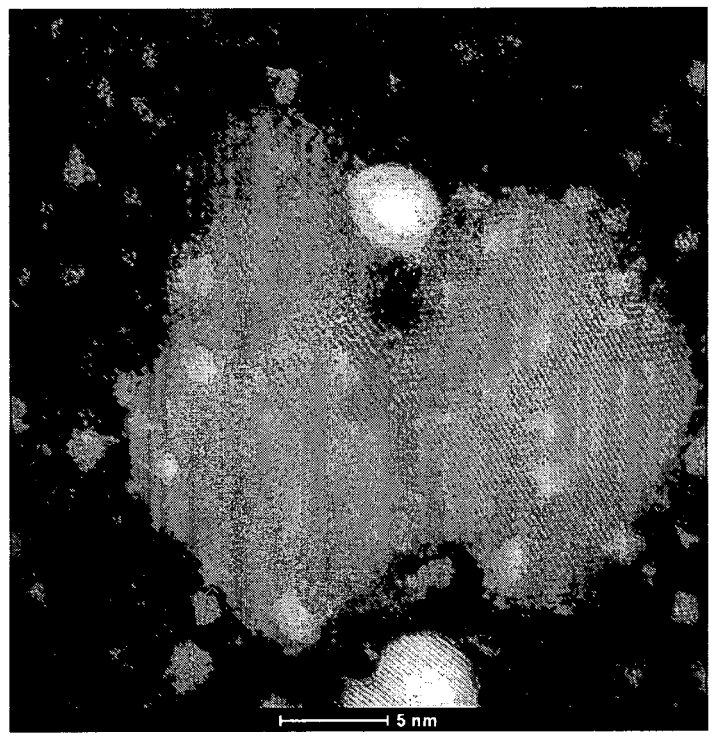
FIG. 21 depicts a HAADF image, with the bright particles and the smaller particles are Pt on Ebonex.

FIG. 20 depicts images of Pt on $Ti_4O_7$. FIG. 21 depicts a HAADF image, with the bright particles and the smaller particles are Pt on Ebonex.

Figure 22:
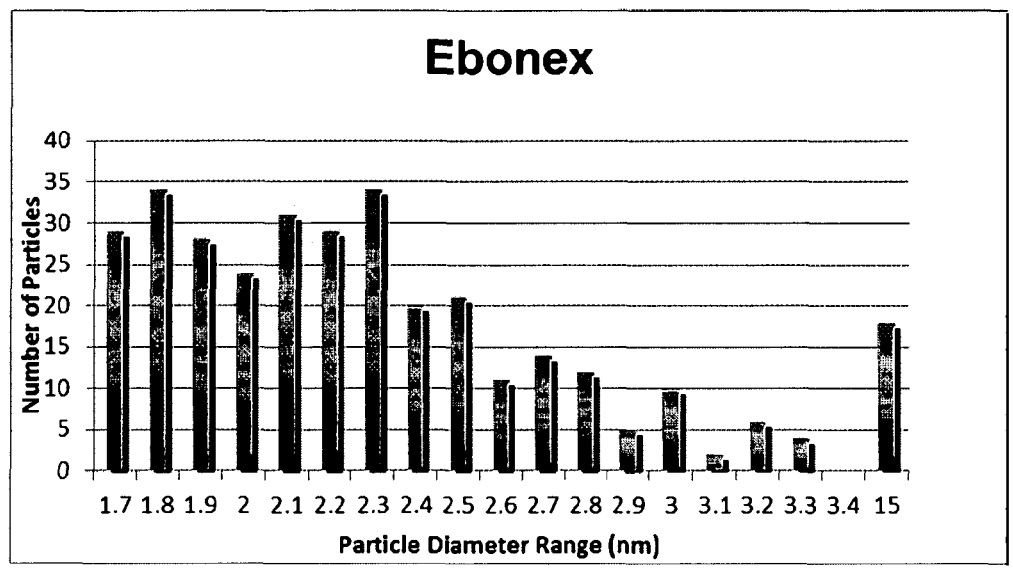
FIG. 22-23 show two examples of deposition of the particle size and distribution of Pt deposited on Ebonex and graphitized carbon.
Figure 23:
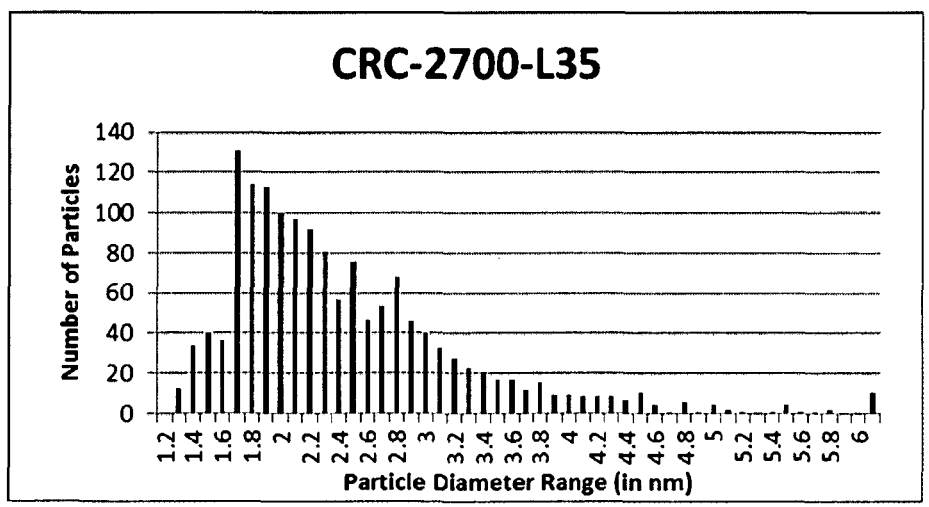

The process creates narrow particles size distribution in the range of about 1.5 to about 3.5 nm with a few agglomerates regardless of support. FIGS. 22 and 23 show two examples of deposition of material on Ebonex and graphitize carbon.

As shown, the present disclosure has advantageously demonstrated uniform distribution of material/particles on Ebonex and graphitized carbon. It is noted that a wet process leads to agglomeration.

Example 6

In general, catalysts are required for both the oxidation of water and the reduction of oxygen. Blended oxides of Ir and Ru are typically superior for water oxidation, whereas mixtures of Pt and Ir perform better when both oxidation of water and reduction of oxygen are required on the same electrode.

A strategy for rationing these elements has been explored by the formation of a thin film using a dry, flame process (e.g., as shown in FIG. 12, etc.). $Ir_xPt_{1-x}O_{2-y}$ and $Ir_xRu_{1-x}O_{2-y}$ were both deposited from the vapor phase by exemplary RSDT assemblies/methods of the present disclosure. An exceptional oxygen evolution current of 25-40 mA/cm2 was observed for the $Ru_{0.41}Ir_{0.59}O_{2-y}$ sample corresponding to a normalized mass activity of about 400 mA/mg.

Figure 24:
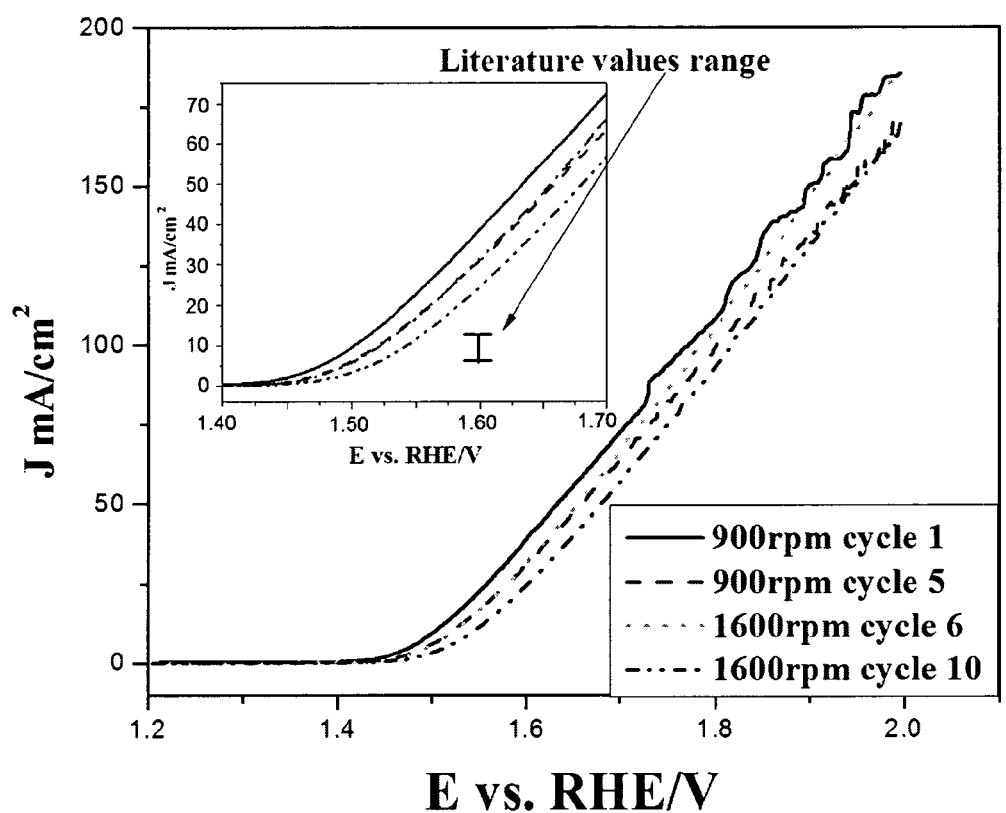
FIG. 24 shows polarization into the oxygen evolution regime of $Ru_xIr_{1-x}O_{2-y}$ on a Au electrode in a 0.5 M $H_2SO_4$ electrolyte.

FIG. 24 shows that the oxygen evolution onset begins around 1.45 V and appears to shift slightly higher potentials about 0.05 V within 5 cycles at a rotation rate of 900 rpm. More particularly, FIG. 24 shows polarization into the oxygen evolution regime of $Ru_xIr_{1-x}O_{2-y}$, a Au electrode in a 0.5 M $H_2SO_4$ electrolyte.

As shown in FIG. 24, at 1600 rpm the onset shifts to 1.5 V. There is a 30% decrease in current after 10 cycles as measured at 1.6 V. In comparison to reported literature values, the data shown above 1.6 V, for oxygen evolution these values of 25-40 mA/cm2 are very promising.

Considering an applied voltage of 1.6 V, where the current density is 25 mA/cm2, at room temperature and atmospheric pressure, the amount of oxygen generated on the electrode amounts to 0.1 cm3/cm2 electrode-min. When normalized to the precious metal mass as shown in FIG. 24, a 400 mA/mgmetal-oxide current is generated. The observed activity compares very favorably to state-of-the-art catalysts in the literature that achieve only 50-75 mA/mgmetal-oxide. This implies good utilization of the metal oxide in the film layer, showing the promise of RSDT controlled structures as electrocatalysts.

Figure 25:
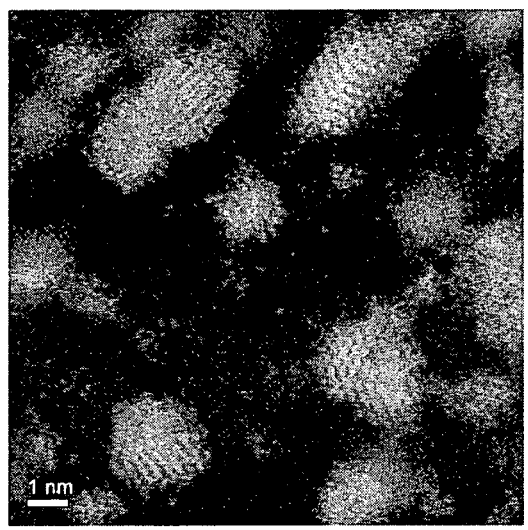
FIG. 25 depicts a HAADF image from a Hitachi HD2700C STEM of $Ru_xIr_{1-x}O_2$ particles deposited by RSDT.

Evidence for the presence of a core enriched in $RuO_2$ could be elucidated by a z-contrast aberration corrected (on probe) S/TEM of the forming film collected on a grid as shown in FIG. 25. Image contrast in FIG. 25 arises from differences in the atomic number between the Ir (z=77) and Ru (z=44) and the number of atoms in each column Most of the representative particles are 1-2 nm in length and have aspect ratios close to 1 while the larger clusters exhibit aspect ratios of 2-3. It should be noted that the larger clusters appear to be coalesced from previously nucleated particles (preferred growth centers) and this could indicate that, at least a portion of the growth on the grid is occurring from the vapor phase directly at these centers. If nucleation occurred sometime during the flight of the particle, as the deposition time progressed it would be expected that the surface would resemble the shorter time grid except that there would be a larger population of same-sized particles. Particles larger than the primary particle length appear to exhibit twin boundaries or grain coalescence.

Example 7

Fiber Coating

In exemplary embodiments, the present disclosure provides for the nano-cluster formation of a metallic platinum (Pt) coating, on manganese oxide inorganic membranes impregnated with multiwall carbon nanotubes (K-OMS-2/MWCNTs), applied by reactive spray deposition technology (RSDT).

The nanostructured coating on the composite membrane material has been evaluated for carbon monoxide (CO) oxidation. The functionalized Pt/K-OMS-2/MWCNTs membranes show excellent conversion (100%) of CO to $CO_2$ at a lower temperature (200° C.) compared to the uncoated K-OMS-2/MWCNTs. Moreover, the Pt/K-OMS-2/MWCNTs membranes show outstanding stability, of more than 4 days, for CO oxidation at 200° C.

Deposition of metals on K-OMS-2 membranes, in the open atmosphere, using a flame synthesis process has not been explored before. This process constitutes a new cost-effective route to functionalize the inexpensive inorganic membrane and thereby incorporate new functionalities leading to improved performance in, inter alia: capacitance; adsorption; and control over conversion and selectivity in catalysis.

Thin conformal films of Pt were deposited using exemplary reactive spray deposition technology (RSDT) assemblies/methods, and the gases in the back of the substrate ensure uniform thickness of the coating. In exemplary embodiments, the method included flowing gases around the substrate to ensure a uniform coating of the fibers was achieved, with a vacuum pull from the back of the substrate.

Figure 26:
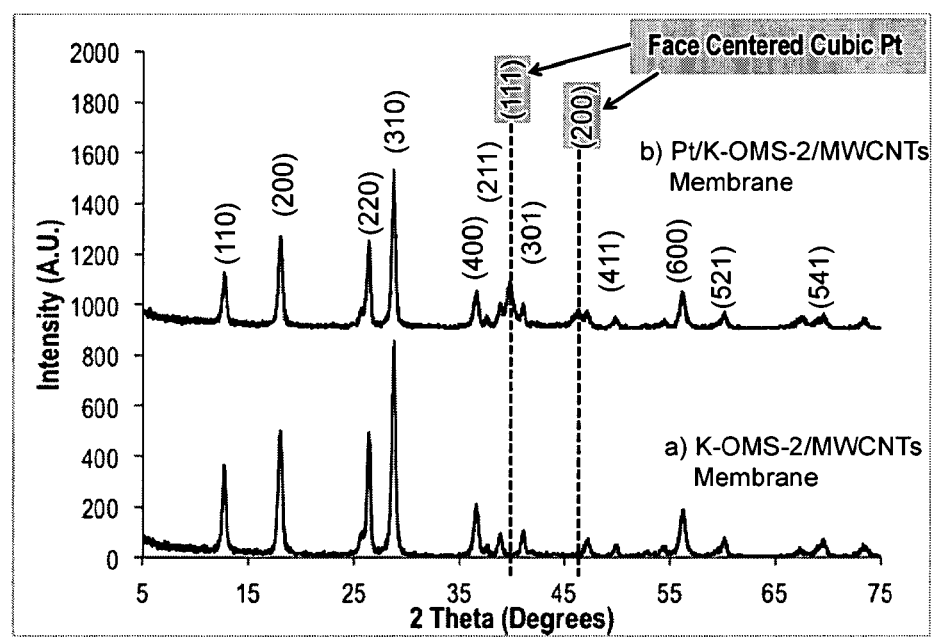
FIG. 26 depicts X-ray diffraction patterns of: a) fresh K-OMS-2/MWCNTs, and b) Pt/K-OMS-2/MWCNTs; diffractions peaks correspond to cryptomelane type manganese oxide (ICSD No. 01-070-8072) and metallic platinum face centered cubic (ICDD No. 00-004-082)

The Pt precursor deposited on the K-OMS-2/MWCNTs membrane material was completely and successfully transformed into crystalline metallic Pt coating as depicted by the X-ray diffraction pattern, FIG. 26. The reflections that correspond to metallic platinum (111) and (200) are clearly observed at angles of about 39.5 and 46.0 degrees two-theta respectively, along with the manganese oxide K-OMS-2 cryptomelane type material XRD peaks, FIG. 26 b).

Figure 27:
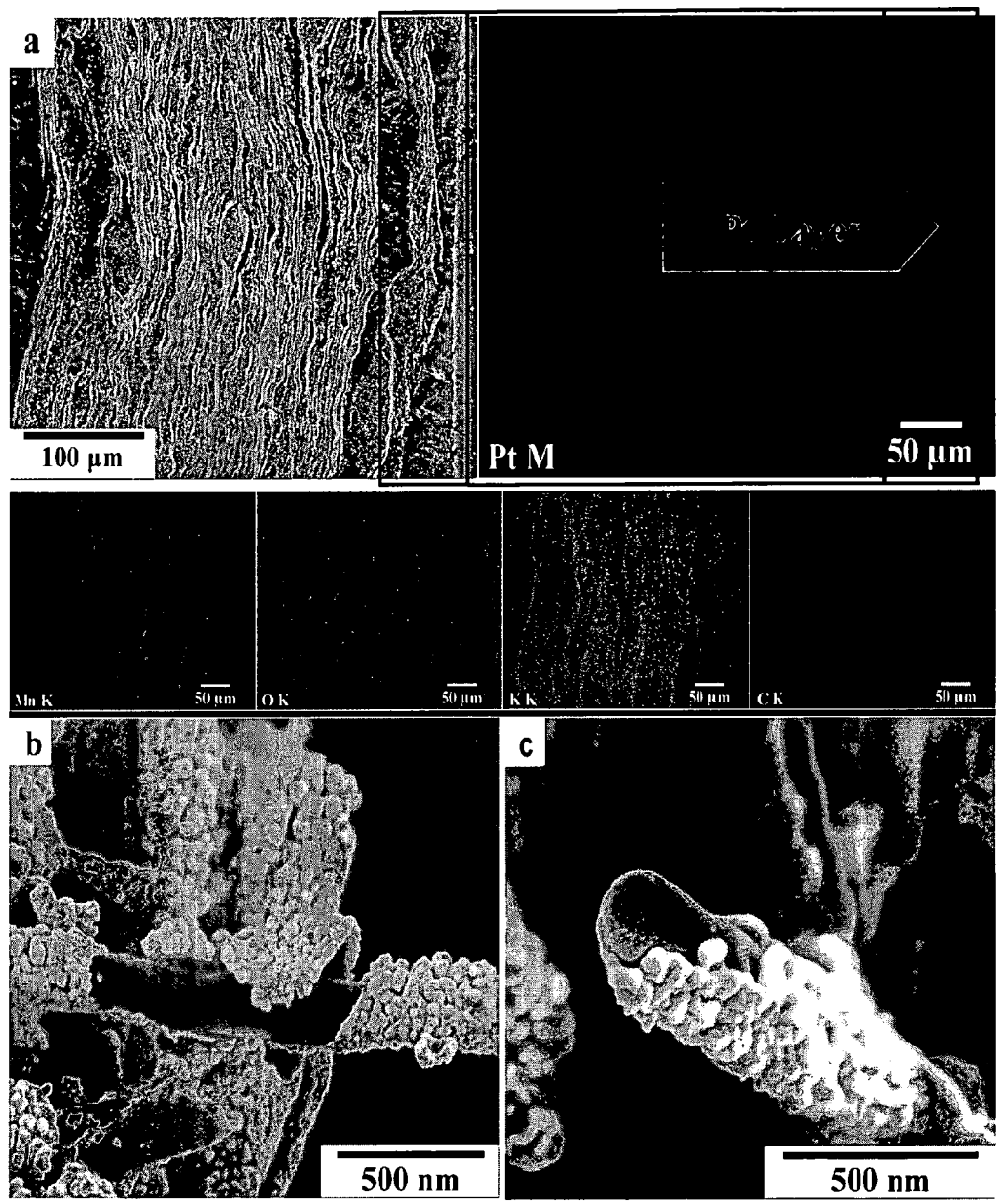
FIGS. 27A-C show scanning electron microscopy of: a) cross section of Pt/K-OMS-2/MWCNTs and EDX mapping, and b, c) focus ion beam scanning electron microscopy (FIB/SEM) of coated Pt/KOMS-2/MWCNTs.
Figure 28:
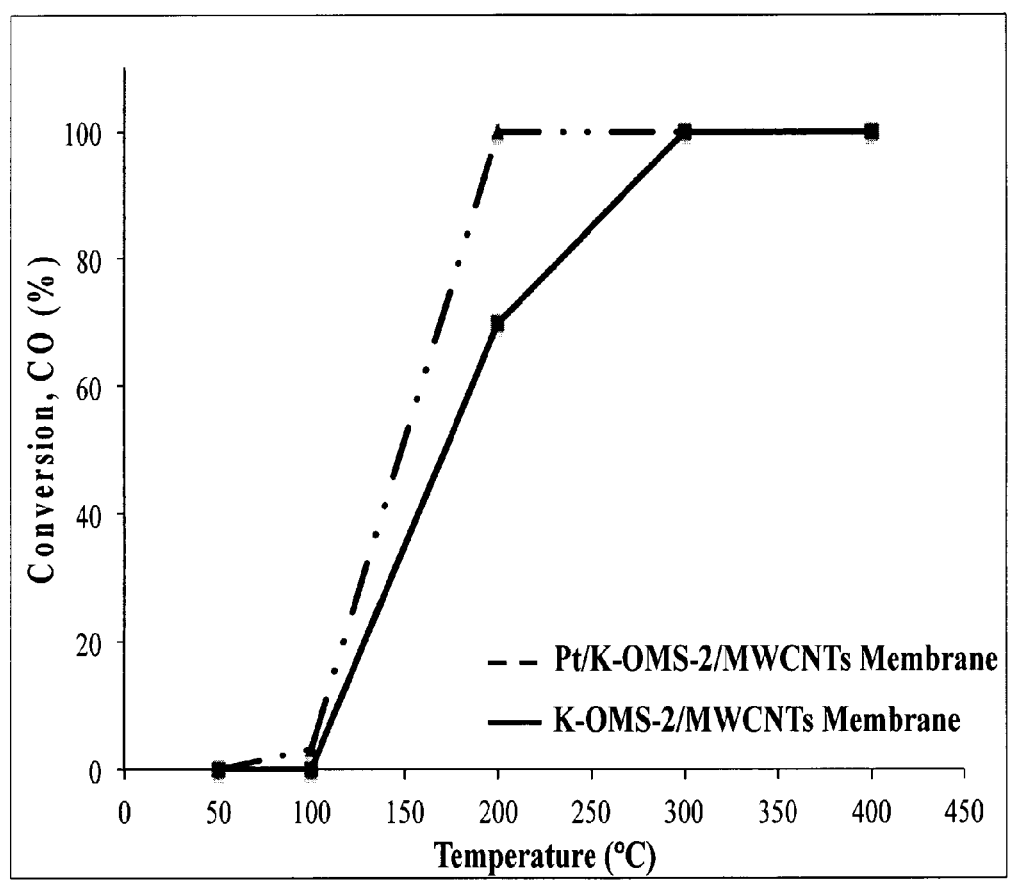
FIG. 28 shows carbon monoxide (CO) oxidation for coated platinum Pt/K-OMS-2/MWCNTs and uncoated K-OMS-2/MWCNTs.
Figure 29:
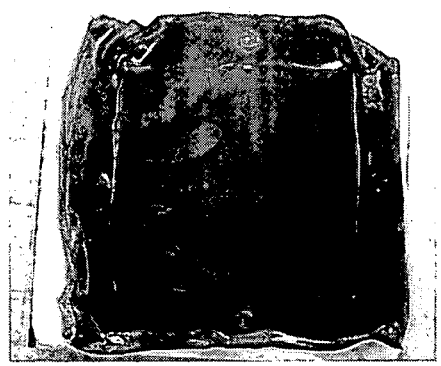
FIG. 29 is an image showing PBI CCM structures prepared by an exemplary RSDT assembly/method.
Figure 30:
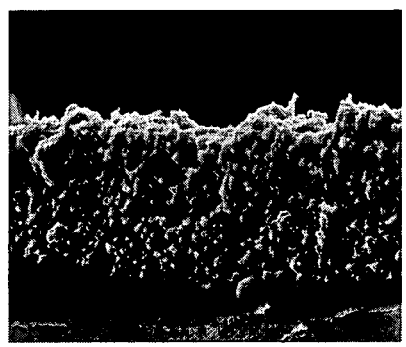
FIG. 30 is a SEM image of 5 μm thick Pt-carbon-PBI.

A uniform coating of Pt covered the upper fibers of K-OMS-2/MWCNTs membrane. The resultant conformal film of Pt nanoclusters covered the individual fibers on the upper-side of the membrane completely, without inducing any fiber aggregation. Moreover, the Pt coating did not cover the interstitial spaces between fibers substantially and this preserved the porous nature of the substrate; this is a property important to the catalytic performance. Focused ion beam scanning electron microscopy (FIB SEM) revealed that the Pt film is constructed of small clusters of less than 50 nm in size that form a shell over the manganese oxide fibers and carbon nanotubes as shown by the FIBSEM micrographs in FIGS. 27B-C that show a debonded Pt film after FIB sectioning. The Pt coat would, otherwise, not come apart after being deposited and would not leave the fibers exposed in the upper layer of the K-OMS-2/MWCNTs membrane. Additionally, deposition by RSDT produces a conformal film, which indicates the capability of the deposition method to permeate porous structures thereby facilitating the complete coverage of the substrate.

Pt coated membrane, Pt/K-OMS-2/MWCNTs showed higher activity than the uncoated K-OMS-2/MWCNTs, reaching 100% conversion not only at low temperature (200° C.) but also being highly stable over a long period of time at 200° C., with no apparent degradation in catalytic conversion after 4 days.

Example 8

High Temperature Proton Exchange Membrane

Figure 31:
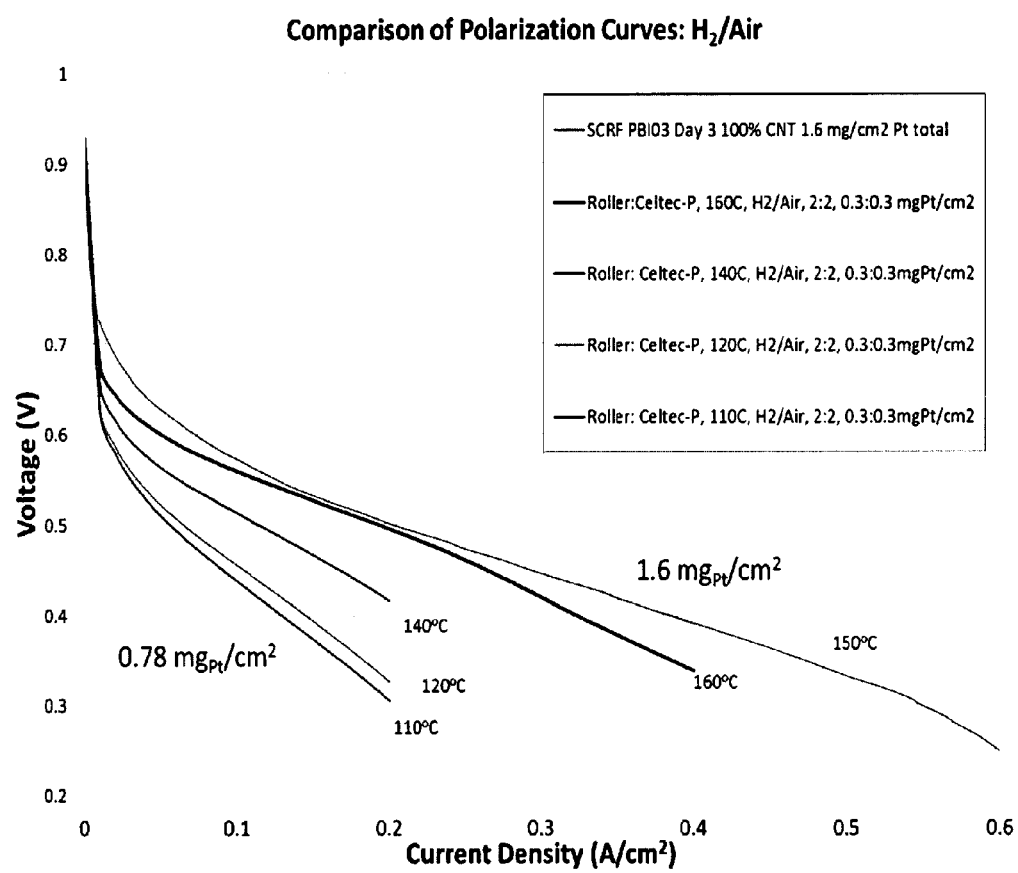
FIG. 31 shows MEA polarization data using both $O_2$ and air as the oxidant at temperatures of 140 and 160° C., and 100-160° C., 0% RH (total loading of 0.78 mg/cm$^2$) PBI membrane.

The membranes under study included a Celtec-P polybenzimidazone based membrane and an Advent TPS pyridine based membrane. Catalyst layers with platinum loading of 0.3-0.38 mg/cm2 and electrode thickness of about 4 μm were produced, some via exemplary RSDT assemblies/methods of the present disclosure. In the RSDT samples, the ionomer to carbon ratio was intentionally kept low to avoid creating a diffusion barrier toward oxygen transport to the platinum. FIG. 31 shows MEA polarization data using both $O_2$ and air as the oxidant at temperatures of 140 and 160° C.

Each electrode was run in triplicate and the performance was reproducible. In both oxygen and air the performance improved with increasing temperature due to improved ionic conductivity. In fact, the larger slope in the MEA at 140° C. is indicative of insufficient membrane conductivity at this temperature. Also, the drop in performance in switching from oxygen to air in the low current density region is indicative of mass transport limitations for oxygen within the catalyst microstructure. It is also possible that phosphate anion blockage of the catalyst resulted in lower performance in the activation region due to active site blockage since excess phosphoric acid was added to the RSDT manufacturing by having a reservoir in the back of the membrane (FIG. 33).

The obtained data presents a 50% reduction in the Pt loading and slightly higher performance using RSDT electrodes compared to the conventional MEAs.

Example 9

Application

Testing core-shell catalyst coatings from the controlled RSDT process for selected applications. The present application builds on its extensive experimental disclosure in Pt-based core-shell nanoparticle catalyst synthesis and characterization and translates this knowledge to targeted multimetallic and metal on metal oxide core-shell structures or full-scale manufacturing of these structures using RSDT. The first applications and material set to fabricate is the catalytic, preferential CO oxidation in $H_2$ (PrO$_x$) using Ru@Pt core-shell nanoparticles and $CeO_2$—Pt nanoparticles. Ru@Pt core-shell catalysts have far superior activity (2 times higher) compared to $Pt_{1-x}Ru_x$ alloy nanoparticles, which in turn are much better than Pt and Ru end members due to synergistic effects of the alloy surfaces. Besides the Ru—Pt nanoparticle system, Pt-based catalyst systems with other metals including Rh, Mo, Sn, Fe, Pd and Cu were explored. In most cases, core-shell architectures with adequately thin Pt shells and cores of either base metal (e.g., Rh or Ru), intermetallics (PtSn18), or metal oxides (MoO$_x$) provided highly modified electrochemical activity for low-temperature CO electrochemical oxidation in Nafion®-based PEM fuel cells.

Example 10

Application in Electrolyzer

As global energy needs grow and fluctuations in grid capacity increase with the integration of increasing levels of renewable energy sources, energy storage is becoming a critical need. Energy capture as hydrogen via water electrolysis has been gaining huge interest in Europe and other parts of the world, with Europe in particular funding large consortiums for development of electrolyzer technology.

Hydrogen is an appealing storage medium because once stored it can be used in a variety of applications including power generation in periods of increased demand, supplementation of the natural gas grid for increased efficiency, vehicle fueling, or use as a high value chemical feedstock for green generation of fertilizer and other chemicals. Water electrolysis based on proton exchange membrane (PEM) technology in particular is an ideal match for generating hydrogen from renewables of all scales to capture generated capacity in excess of demand that would otherwise be curtailed. Enabling characteristics of this solution include the rapid response time to power fluctuations.

Today, the majority of cost and energy use in PEM electrolyzer manufacturing is contributed by the cell stack manufacturing processes. In addition, while the energy requirements for raw material procurement are not a direct energy cost for the manufacturer, extraction of the catalyst materials from raw ore is a highly energy intensive process. The acidic nature of the membrane limits the choices of catalyst materials to more expensive options such as platinum group metals (PGMs) and metal oxides. Refinement of the PGMs typically used for PEM electrolyzers requires on the order of tens of kilowatts per gram of catalyst. Therefore, not even including the nanopowder fabrication processes typically utilized to convert the PGM precursors to useful catalyst, PGM processing is high on the pare to chart for MEA fabrication energy usage.

It is believed that the current catalyst loadings are mainly driven by process variation and the catalyst activity is not the limiting factor for electrolysis. The present disclosure has demonstrated feasibility of 90% reductions in noble metal content on the cathode electrode by switching from wet processing to exemplary RSDT processing.

An obstacle to catalyst loading reduction on the anode side of the cell is the lack of stability of traditional fuel cell carbon supports at electrolysis potentials. The present disclosure provides for work on non-carbon supports, while wetting the membrane during deposition (e.g., exemplary RSDT deposition) to keep humidity in membrane.

Figure 32:
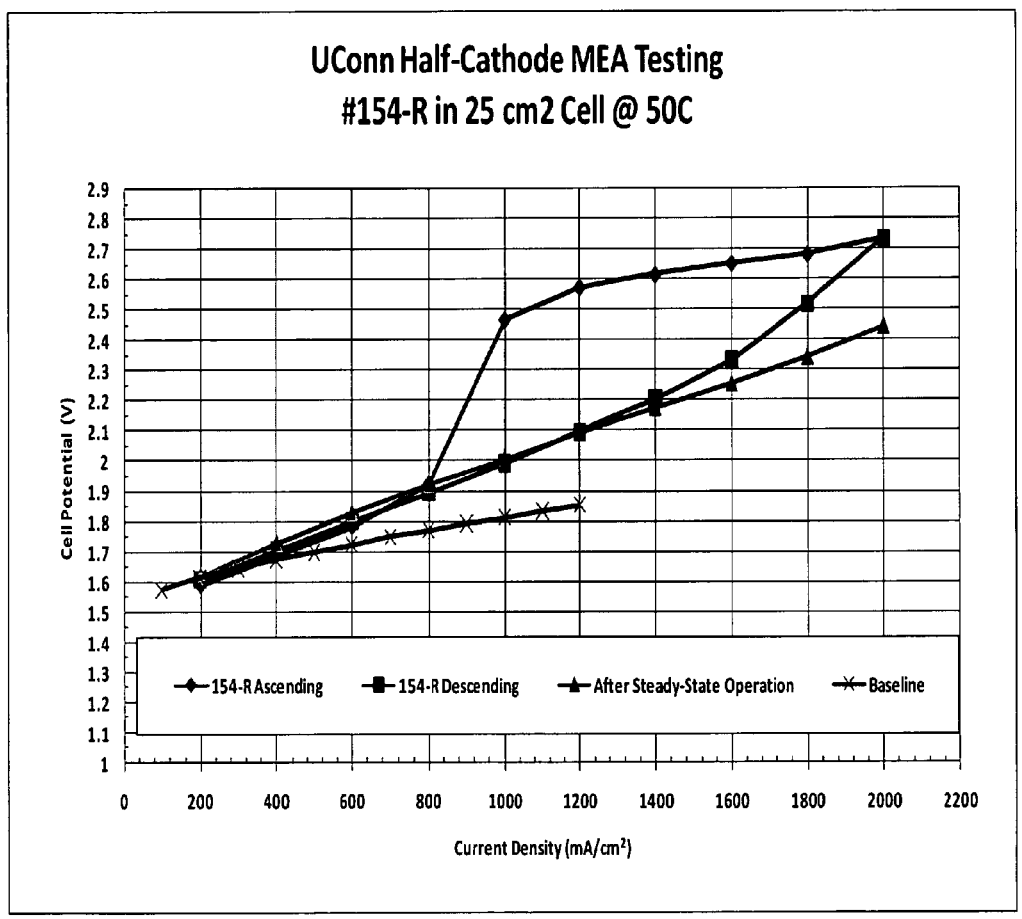
FIG. 32 shows Pt loading of 0.5 by RSDT; base line wet processing of 5 mg/cm$^2$.

Performance for the oxygen side of the cell, 100's of hours of stable operation have been observed for both anode and cathode electrode (FIG. 32).

Example 11

Coating of Fibers and Engineering of Membranes

Manganese oxide K-OMS-2 is a porous mixed-valent metal oxide with applications in catalysis, environmental remediation, sorption processes, and microbial fuel cells. One rationale for the synthesis of this octahedral molecular sieve (OMS) is based on its low cost, processability, stability, and excellent catalytic activity in different redox reactions. Its processability permits the preparation of K-OMS-2 manganese oxide materials composed of endless-type nanofibers that can readily be assembled into a paper or membrane.

This versatile free-standing structure in the form of a membrane is flexible, re-dispersible, foldable, moldable, and can be modified by ion-exchange, doping, distributed over large areas for clean up as well as being used as a supporting structure to produce composite materials. Membranes are of special interest due to their porosity, permeability, and conductivity and hence their potential uses as sensors, catalysts, and in separation processes that remove bacteria, microorganisms, particulates, and organic material.

Nano-composites of MWCNTs filled with $MnO_2$ have been prepared and the results show improvements in both electrochemical and conduction properties. However the difficulty in the processing is formation of a conformal, homogeneous coating of Pt on inorganic K-OMS-2 impregnated with MWCNTs (e.g., the membrane substrate) without reducing the membrane porosity. The coated membrane (Pt/K-OMS-2/MWCNTs) showed excellent catalytic activity at a relatively low temperature (200° C.). Thin conformal films of Pt were advantageously deposited using exemplary reactive spray deposition technology (RSDT) assemblies/methods of the present disclosure.

An exemplary process essentially combines the catalyst production and film formation steps into one, takes place in the open atmosphere and eliminates the need to dispose of solvent waste; the solvent is substantially completely combusted to $CO_2$ and $H_2O$. Depending on the processing conditions, a film can form either from the vapor phase (e.g., the product reaches the substrate at a stage somewhere between the monomer and nanoparticle pathway), by a physical impingement of a fully formed nanoparticle (e.g., a ballistic collision), or by a combination of both mechanisms.

The exact mechanism of growth is affected by, inter alia, the residence time in a given thermal profile, concentration of reactants, the precursor composition, oxidant/fuel flow rates, gas flow rate and the distance between the substrate and the nozzle.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for fabricating catalytic material comprising:
providing a first elongated member extending from a first end to a second end, the first end in fluid communication with a liquid precursor feedstock that includes particles;
providing a second elongated member extending from a first end to a second end, the first end mounted with respect to the second end of the first elongated member and in fluid communication with the liquid precursor feedstock;
providing a channel of a housing, the channel disposed around at least a portion of the second elongated member;
supplying a fuel to the channel, the channel configured and dimensioned to supply the fuel along with the liquid precursor feedstock from the second end of the second elongated member to form a substantially co-flow spray;
supplying the substantially co-flow spray into the open atmosphere proximal to the second end of the second elongated member and igniting it to form a flame spray;
providing a surface of the housing positioned proximal to the second end of the second elongated member and angled relative to the central axis of the second elongated member, the angled surface including a plurality of ports, each port configured and dimensioned to supply a gas stream;
igniting the gas stream to stabilize the flame spray;
providing a circular quench assembly that includes a plurality of circumferentially-spaced nozzles that define a substantially circular quench zone distal to the second end of the second elongated member;
providing air flow at an inlet pressure through the plurality of circumferentially-spaced nozzles to establish a region of reduced pressure relative to the inlet pressure in the center of the substantially circular quench zone that pulls in a volume of surrounding air and creates a conical ring of air, thereby introducing turbulence and vapor to the flame spray to cool the flame spray and dilute the gas stream; and
directing the stabilized flame spray toward a substrate for deposition of the particles thereon.

2. The method of claim 1, wherein the substrate is mounted with respect to a substrate holder, the substrate holder configured and dimensioned to hold a liquid to hydrate or cool the substrate.

3. The method of claim 1, wherein the deposited particles include a microstructure having nanosized features.

4. The method of claim 1, wherein the liquid precursor feedstock includes propane; and
wherein the co-flow spray is formed at least in part by a combination of pressure, heat and supercritical atomization due to the expansion of the propane above its critical temperature thereby forming droplets.

5. The method of claim 1, wherein the angled surface of the housing is angled at about 45° relative to the central axis of the second elongated member.

6. The method of claim 1, wherein the angled surface includes six ports, the ports positioned substantially evenly spaced apart from one another about a radius around the central axis of the second elongated member.

7. The method of claim 1, further comprising at least one humidifier nozzle, the at least one humidifier nozzle configured and dimensioned to supply humidity to the substrate.

8. The method of claim 1, wherein the deposited particles include platinum particles; and wherein the substrate includes a corrosion resistant support.

9. The method of claim 1, wherein the deposited particles form at least a portion of an oxygen evolution anode.

10. The method of claim 1, wherein the deposited particles form at least a portion of a lithium battery cathode or anode.

11. The method of claim 1, wherein the deposited particles form at least a portion of a core-shell particle structure.

12. The method of claim 1, wherein the substrate includes nanofibers; and
wherein at least a portion of the particles are deposited on the nanofibers.

13. The method of claim 1, wherein the deposited particles include amorphous particles.

14. The method of claim 1, wherein the deposited particles include crystalline particles.

15. A fabrication method, comprising:
providing a first elongated member extending from a first end to a second end, the first end in fluid communication with a liquid precursor feedstock that includes particles;
providing a second elongated member extending from a first end to a second end, the first end mounted with respect to the second end of the first elongated member and in fluid communication with the liquid precursor feedstock;
providing a channel of a housing, the channel disposed around at least a portion of the second elongated member;
supplying a fuel to the channel, the channel configured and dimensioned to supply the fuel along with the liquid precursor feedstock from the second end of the second elongated member to form a substantially co-flow spray;
supplying the substantially co-flow spray into the open atmosphere proximal to the second end of the second elongated member and igniting it to form a flame spray;
providing a surface of the housing positioned proximal to the second end of the second elongated member and angled relative to the central axis of the second elongated member, the angled surface including a plurality of ports, each port configured and dimensioned to supply a gas stream;

igniting the gas stream to stabilize the flame spray;

providing a circular quench assembly that includes a plurality of circumferentially-spaced nozzles that define a substantially circular quench zone distal to the second end of the second elongated member;

delivering a quenching gas flow at an inlet pressure through the plurality of circumferentially-spaced nozzles to establish a region of reduced pressure relative to the inlet pressure in the center of the substantially circular quench zone, thereby introducing turbulence and vapor to the flame spray to cool the flame spray and dilute the gas stream; and directing the stabilized flame spray toward a substrate for deposition of the particles thereon.

16. The method of claim 15, wherein the substrate is mounted with respect to a substrate holder, the substrate holder configured and dimensioned to hold a liquid to hydrate or cool the substrate.

17. The method of claim 15, wherein the deposited particles include a microstructure having nanosized features.

18. The method of claim 15, wherein the angled surface of the housing is angled at about 45° relative to the central axis of the second elongated member.

19. The method of claim 15, wherein the angled surface includes six ports, the ports positioned substantially evenly spaced apart from one another about a radius around the central axis of the second elongated member.

20. The method of claim 15, further comprising at least one humidifier nozzle, the at least one humidifier nozzle configured and dimensioned to supply humidity to the substrate.

* * * * *